(12) United States Patent
Matsumura

(10) Patent No.: US 9,998,170 B2
(45) Date of Patent: Jun. 12, 2018

(54) ACTIVE PHASED ARRAY TRANSMITTER, ACTIVE PHASED ARRAY RECEIVER, AND ACTIVE PHASED ARRAY TRANSCEIVER

(71) Applicant: FUJITSU LIMITED, Kawasaki-shi, Kanagawa (JP)

(72) Inventor: Hiroshi Matsumura, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/425,064

(22) Filed: Feb. 6, 2017

(65) Prior Publication Data

US 2017/0257137 A1     Sep. 7, 2017

(30) Foreign Application Priority Data

Mar. 3, 2016  (JP) ................. 2016-040993

(51) Int. Cl.
*H04B 1/48*     (2006.01)
*H04B 1/04*     (2006.01)
(Continued)

(52) U.S. Cl.
CPC .......... *H04B 1/48* (2013.01); *H04B 1/0483* (2013.01); *H04B 1/16* (2013.01); *H04B 7/06* (2013.01);
(Continued)

(58) Field of Classification Search
CPC ......... H04B 1/48; H04B 1/0483; H04B 1/16; H04B 7/06; H04B 7/08; H04B 2001/0491
See application file for complete search history.

(56) References Cited

U.S. PATENT DOCUMENTS 6,363,126 B1 *  3/2002  Furukawa ............. H04L 27/066
                                                           375/332
8,583,170 B2 * 11/2013  Sundstrom ........... H04B 1/0082
                                                           455/205

(Continued)

FOREIGN PATENT DOCUMENTS

JP       H10-503892       4/1998
JP       2011-507000 A1   3/2011
(Continued)

*Primary Examiner* — Janice Tieu
(74) *Attorney, Agent, or Firm* — Kratz, Quintos & Hanson, LLP

(57) ABSTRACT

An active phased array transmitter includes: a transmission frequency signal source that generates a transmission frequency signal; a modulator that modulates the transmission frequency signal based on transmission data and outputs the modulated transmission signal; a plurality of transmitters that change the phase and intensity of the modulated transmission signal; a transmission phased array antenna including a plurality of transmission antennas; a local transmission frequency signal source that generates a local transmission frequency signal; a first mixer that generates a first intermediate frequency transmission signal from a received signal of the radio waves output from the transmission antennas and the local transmission frequency signal; a second mixer that generates a second intermediate frequency transmission signal from the modulated transmission signal and the local transmission frequency signal; a transmission correlation processing circuitry that detects a transmission correlation relationship; and a transmission relative relationship detector that detects, from the transmission correlation relationship.

9 Claims, 20 Drawing Sheets

(51) Int. Cl.
  *H04B 1/16* (2006.01)
  *H04B 7/06* (2006.01)
  *H04B 7/08* (2006.01)
(52) U.S. Cl.
  CPC ....... *H04B 7/08* (2013.01); *H04B 2001/0491* (2013.01)

(56) References Cited

U.S. PATENT DOCUMENTS

2003/0007450 A1* 1/2003 Ohtaki ................... H04B 7/084
  370/208
2005/0239419 A1 10/2005 Fudaba
2009/0153394 A1 6/2009 Navarro

FOREIGN PATENT DOCUMENTS

WO 95/34103 A1 12/1995
WO 2004/109952 A1 12/2004

* cited by examiner

TO MIXER 32

ACTIVE PHASED ARRAY TRANSMITTER, ACTIVE PHASED ARRAY RECEIVER, AND ACTIVE PHASED ARRAY TRANSCEIVER

CROSS-REFERENCE TO RELATED APPLICATION

This application is based upon and claims the benefit of priority of the prior Japanese Patent Application No. 2016-040993, filed on Mar. 3, 2016, the entire contents of which are incorporated herein by reference.

FIELD

The embodiments discussed herein are related to an active phased array transmitter, an active phased array receiver, and an active phased array transceiver.

BACKGROUND

In the radio communication field, as a transmitter that accurately controls an emission direction of a radio wave without mechanically changing the direction and a receiver that accurately detects an arrival direction of a radio wave without mechanically changing the direction, an active phased array transmitter and an active phased array receiver are known. In addition, as a transceiver that has the transmission function and the reception function, an active phased array transceiver is known. First, the active phased array transmitter is described as an example.

The active phased array transmitter has an array antenna including a plurality of transmission antennas formed in an integrated manner in an array and spatially synthesizes radio waves emitted from the plurality of transmission antennas. The active phased array transmitter has a plurality of transmitting units connected to the plurality of transmission antennas, a transmission frequency signal source for generating a high-frequency transmission frequency signal, and a modulator that modulates the transmission frequency signal based on transmission data and generates the modulated transmission signal. The modulated transmission signal is supplied to the plurality of transmitting units. The transmitting units has variable gain amplifiers and phase shifters, respectively. The transmitting units independently change the amplitude and phase of the supplied modulated transmission signal. Signals paths formed by the transmitting units are referred to as channels.

The array antenna may control emission directions of radio waves to be output from the array antenna by controlling the signal of the channels so that the amplitudes and phases of the signal of the channels match in a certain direction. However, if the modulated transmission signal has a significantly high frequency or a millimeter wave is used, a variation in characteristics of circuits on which the transmitting units are mounted is large, the transmitting units are largely affected by a temperature fluctuation, the circuit characteristics vary, the amplitudes and phases of the output signal of the channels may not be controlled with high accuracy, and the actual directionality and the emission directions may not be desirable.

An active phased array transmitter that has a calibration function with a configuration for detecting the amplitude and phase of an output signal for each of channels has been proposed. The active phased array transmitter has a circuit for detecting the amplitude and phase of the output signal at positions close to transmission antennas for the channels. This circuit detects the amplitude and phase of the output signal of the transmission channels on a channel basis and corrects amplifiers and phase shifters for the transmission channels so that detected differences between the channels are reduced to zero. Specifically, a coupler is arranged close to the transmission antennas, the transmission signal is output from only a single channel, and the coupler generates a reception signal corresponding to the transmission signal of the single channel. A mixer mixes the reception signal with a local transmission frequency signal having a frequency slightly different from a transmission frequency signal so that the reception signal is converted to an intermediate frequency signal with a low frequency. The intermediate frequency signal is converted from analog to digital and subjected to a fast Fourier transformation (FFT) process by digital processing, and the amplitude and phase of the intermediate frequency signal are detected. By executing this process on all the channels, a variation in differences between the amplitudes of the signal of the channels and a variation in differences between the phases of the signal of the channels may be detected. Based on the results of the detection, the amplifiers and phase shifters of the transmitting units (channels) are controlled and the amplitude and phase of the signal are reset. Actually, this cycle is executed multiple times, and calibration is executed so that variations in differences between the amplitudes and phases of radio waves from the multiple transmission antennas are equal to or lower than defined values.

In the aforementioned technique, the transmission frequency signal and the local transmission frequency signal that are high frequency signals are generated by independent signal sources. Thus, uncorrelated jitter caused by phase noise is superimposed on the transmission frequency signal and the local transmission frequency signal. When the mixer generates the low-frequency intermediate frequency signal from the transmission frequency signal and the local transmission frequency signal, large jitter occurs to the intermediate frequency signal. Thus, there is a problem that the accuracy of the amplitude and phase of the detected intermediate frequency signal is low and that the accuracy of the calibration is low. Not only the active phased array transmitter but also the active phased array receiver and the active phased array transceiver have the same problem as described above.

The followings are reference documents.
[Document 1] Japanese National Publication of International Patent Application No. 2011-507000,
[Document 2] International Publication Pamphlet No. WO2004/109952, and
[Document 3] Japanese National Publication of International Patent Application No. 10-503892.

SUMMARY

According to an aspect of the invention, an active phased array transmitter includes: a transmission frequency signal source that generates a transmission frequency signal; a modulator that modulates the transmission frequency signal based on transmission data and outputs the modulated transmission signal; a plurality of transmitters that change the phase and intensity of the modulated transmission signal; a transmission phased array antenna including a plurality of transmission antennas that output radio waves corresponding to output of the plurality of transmitters; a local transmission frequency signal source that generates a local transmission frequency signal having a frequency different by a predetermined frequency from the frequency of the transmission frequency signal; a first mixer that generates a first intermediate frequency transmission signal from a received signal of the radio waves output from the transmission antennas and the local transmission frequency signal; a second mixer that generates a second intermediate frequency transmission signal from the modulated transmission signal and the local transmission frequency signal; a transmission correlation processing circuitry that detects a transmission correlation relationship between the first intermediate frequency transmission signal and the second intermediate frequency transmission signal; and a transmission relative relationship detector that detects, from the transmission correlation relationship detected by the transmission correlation processing circuitry, transmission relative relationships between the phases and intensities of the radio waves output from the transmission antennas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Before embodiments are described, a general active phased array transmitter, a general active phased array receiver, and a general active phased array transceiver are described below.

Figure 1:
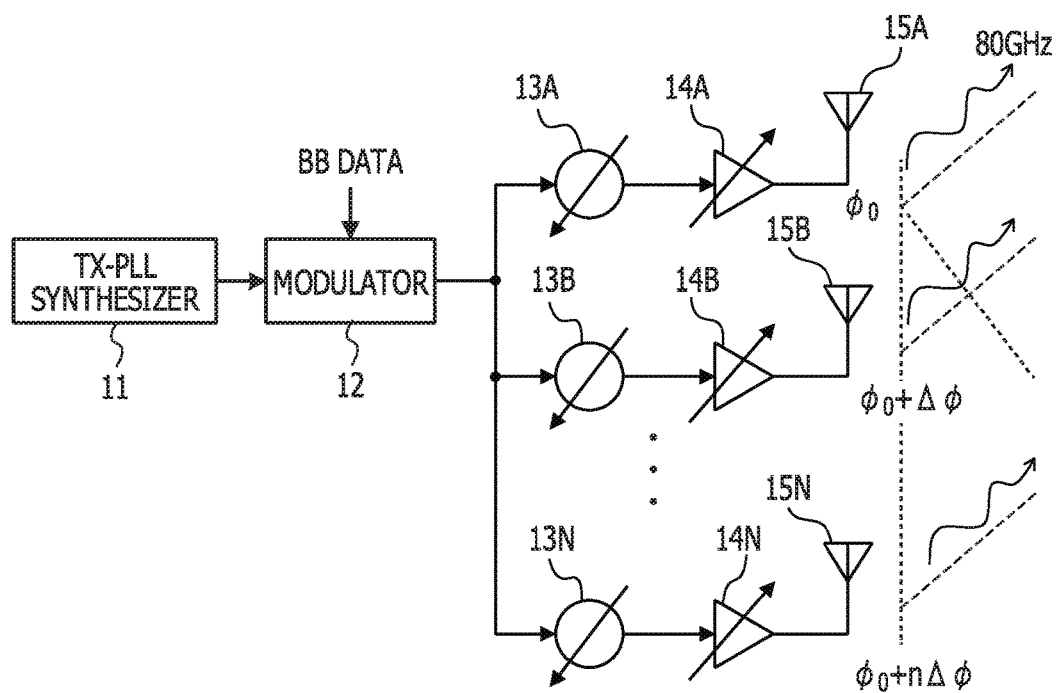
FIG. 1 is a diagram illustrating a schematic configuration of a general active phased array transmitter.

FIG. 1 is a diagram illustrating a schematic configuration of the general active phased array transmitter.

The general active phased array transmitter includes a TX-PLL synthesizer 11, a modulator 12, a number N (N is an integer of two or greater) of transmitting units, and a number N of transmission antennas 15A to 15N. The TX-PLL synthesizer 11 is a transmission frequency signal source for generating a transmission frequency signal having a high frequency (of, for example, 80 GHz). The modulator 12 modulates the transmission frequency signal based on transmission data (baseband (BB) data) and generates the modulated transmission signal. The number N of transmitting units include phase shifters 13A to 13N and variable gain amplifiers 14A to 14N, respectively. The phase shifters 13A to 13N independently change the phase of the modulated transmission signal output from the modulator 12. The variable gain amplifiers 14A to 14N independently change the amplitude of the modulated transmission signal having the phase adjusted by the phase shifters 13A to 13N. The variable gain amplifiers 14A to 14N may be arranged on the upstream side of the phase shifters 13A to 13N. Signal paths formed by the transmitting units are referred to as channels in some cases. The transmission antennas 15A to 15N form an array antenna and output radio waves corresponding to the modulated transmission signal output from the transmitting units and having the adjusted amplitude and the adjusted phase. The radio waves emitted from the transmission antennas 15A to 15N are spatially synthesized.

The array antenna may control emission directions of the radio waves to be spatially synthesized and output from the array antenna by controlling the signal to be output from the channels so that the amplitudes and phases of the signal match in a certain direction. In FIG. 1, if the transmission antenna 15A outputs a radio wave having a phase of $\phi_0$, the transmission antenna 15B outputs a radio wave having a phase of $\phi_0 + \Delta\phi_0$, and the transmission antenna 15N outputs a radio wave having a phase of $\phi_0 + (n-1)\Delta\phi_0$. A transmission antenna that is adjacent to a certain transmission antenna that outputs a radio wave having a certain phase outputs a radio wave having a phase different by $\Delta\phi_0$ from the certain phase. Thus, the directions in which the radio waves are emitted from the array antenna are directions illustrated in FIG. 1.

Figure 2:
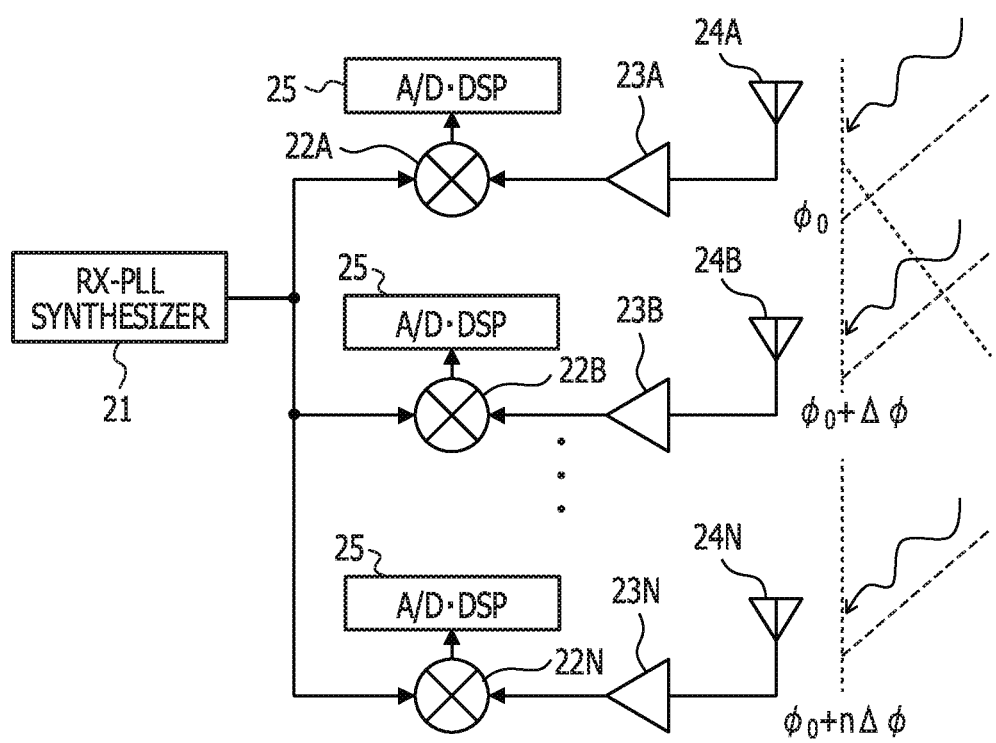
FIG. 2 is a diagram illustrating a schematic configuration of a general active phased array receiver.

FIG. 2 is a diagram illustrating a schematic configuration of the general active phased array receiver.

The general active phased array receiver includes an RX-PLL synthesizer 21, a number N of receiving units, and a number N of reception antennas 24A to 24N. The RX-PLL synthesizer 21 is a reception frequency signal source for generating a reception frequency signal having a high frequency (of, for example, 80 GHz). The number N of receiving units include a number N of demodulators 22A to 22N and a number N of low noise amplifiers 23A to 23N, respectively. The low noise amplifiers 23A to 23N amplify received signals corresponding to radio waves received by the reception antennas 24A to 24N. The demodulators 22A to 22N mix the reception frequency signal with the received signals amplified by the low noise amplifiers 23A to 23N and generate intermediate frequency (IF) reception signals having a relatively low frequency (mixing). In this case, signal paths formed by the receiving units are referred to as channels in some cases.

The IF reception signals generated by the demodulators 22A to 22N are transmitted to an A/D DSP 25 for executing analog-to-digital (A/D) conversion and digital data processing. After the A/D DSP 25 converts the IF reception signals to digital data, the A/D DSP 25 executes a fast Fourier transformation (FFT) process on the digital data. Differences between the amplitudes of the signals of the channels and differences between the phases of the signals of the channels are calculated based on the amplitudes and phases of the IF reception signals detected by the signal processing, and arrival directions of the radio waves are detected. In FIG. 2, the reception antenna 24A receives a radio wave having a phase of $\phi_0$, the reception antenna 24B receives a radio wave having a phase of $\phi_0+\Delta\phi_0$, and the reception antenna 24N receives a radio wave having a phase of $\phi_0+(n-1)\Delta\phi_0$. A reception antenna that is adjacent to a certain reception antenna that receives a radio wave having a certain phase receives a radio wave having a phase different by $\Delta\phi_0$ from the certain phase. Thus, the arrival directions of the radio waves to be received by the array antenna are directions illustrated in FIG. 2.

If the modulated transmission signal has a significantly high frequency or a signal used by a millimeter wave transmitter (5G·E-band) or millimeter radar is used, a variation in characteristics of circuits on which the transmitting units are mounted is large, the transmitting units are largely affected by a temperature fluctuation, and the circuit characteristics vary. In addition, these variations vary depending on the transmitter. If an amplitude is shifted from its ideal state or a phase is shifted from its ideal state, the shape of an emitted beam collapses, the beam is not transferred in a desirable direction, and directional resolution is reduced. The same applies to the receiver. That is, a variation in characteristics of circuits on which the receiving units are mounted is large. If the characteristics of the circuits are changed by a temperature fluctuation, directions in which radio waves are received are not properly detected, and directional resolution is reduced.

An active phased array transmitter (receiver) with a calibration function of detecting the amplitude and phase of a transmission (received) signal for each of channels and adjusting, based on the results of the detection, the amplitude and phase of the signal for each of the channels has been proposed. Since directional resolution is determined based on the accuracy of calibration, it may be said that the calibration function is one of primary functions for a phased array technique.

Figure 3A:
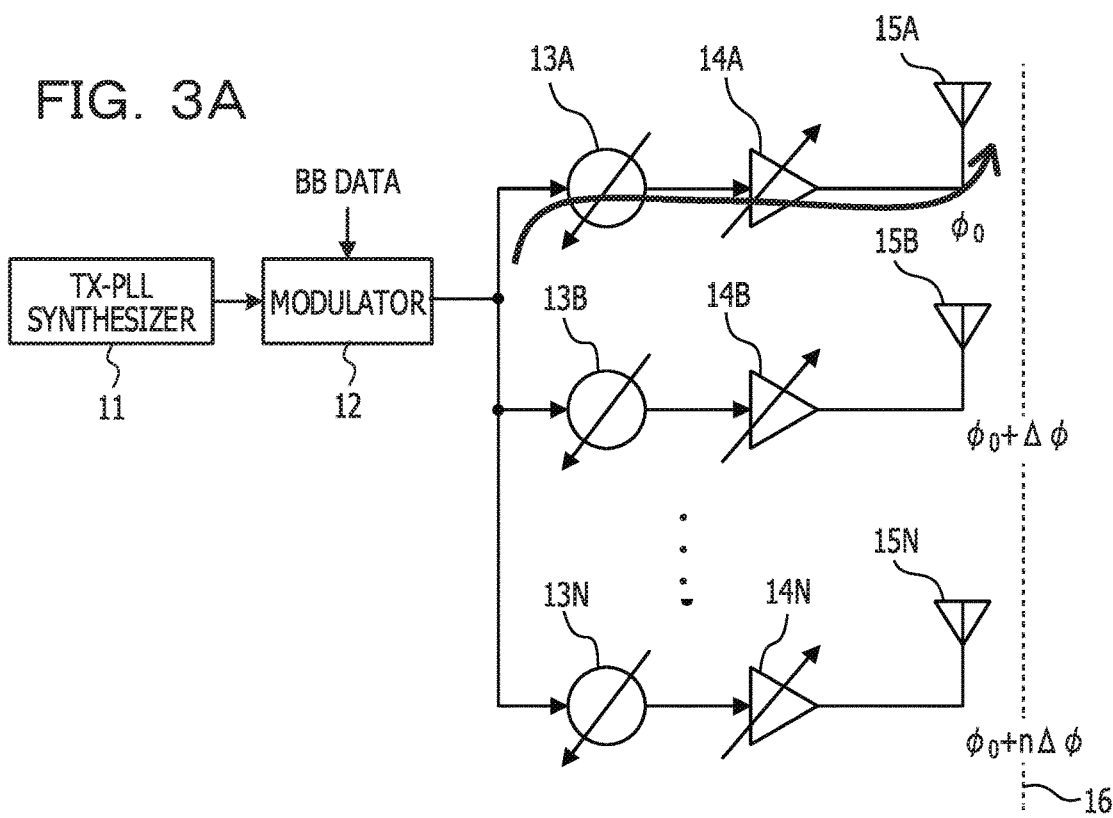
FIG. 3A is a diagram describing a method of calibrating the general active phased array transmitter.
Figure 3B:
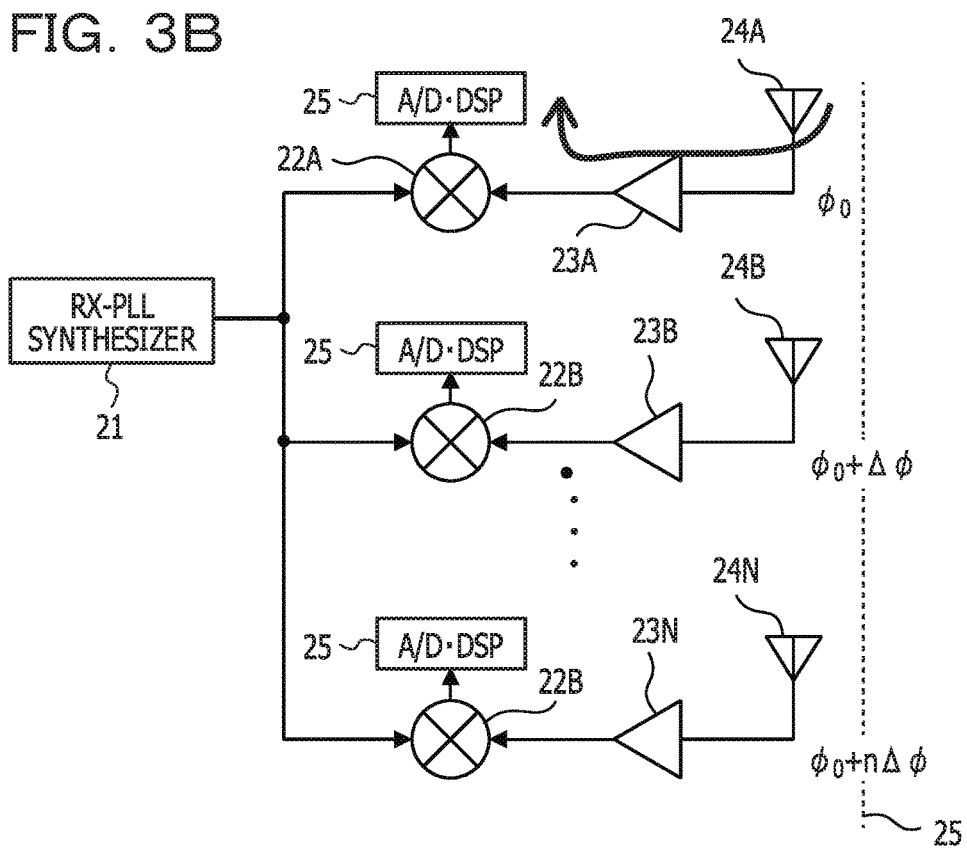
FIG. 3B is a diagram describing a method of calibrating the general active phased array receiver.

FIG. 3A is a diagram describing a method of calibrating the general active phased array transmitter, while FIG. 3B is a diagram describing a method of calibrating the general active phased array receiver.

As illustrated in FIG. 3A, when the general active phased array transmitter is to be calibrated, a reception coupler 16 is arranged near the transmission antennas 15A to 15N forming an array antenna and receives radio waves output from the transmission antennas 15A to 15N. One of the multiple transmission channels is set to be active, while the other transmission channels are set to be non-active (for example, gains of the amplifiers are set to zero). The reception coupler 16 receives a radio wave (modulated transmission signal) from the one transmission channel, and the amplitude and phase of the signal is calculated by a calibration circuit. This process is executed on all the multiple transmission channels. Then, differences between the amplitudes of the modulated transmission signal of the multiple transmission channels and differences between the phases of the modulated transmission signal of the multiple transmission channels are calculated, correction amounts are calculated, and the amplitudes and phases of the channels are reset.

As illustrated in FIG. 3B, when the general active phased array receiver is to be calibrated, a transmission coupler 25 is arranged near the reception antennas 24A to 24N, and the reception antennas 24A to 24N receive radio waves from the transmission coupler 25. The receiver is able to detect differences between the amplitudes of the signal of the multiple reception channels and differences between the phases of the signal of the multiple reception channels in parallel, calculates correction amounts based on the detected differences between the amplitudes and the detected differences between the phases, and uses the calculated amounts as correction amounts for the digital processing.

Figure 4:
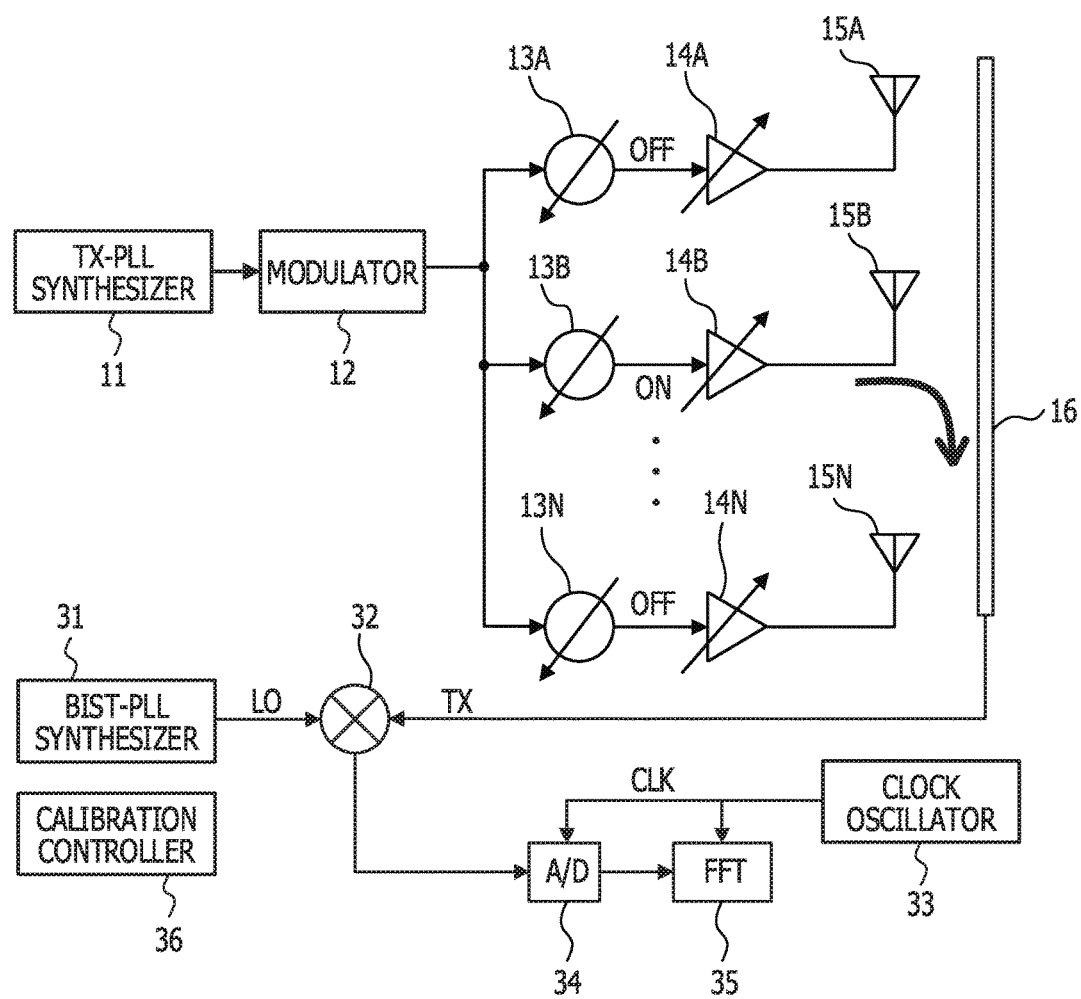
FIG. 4 is a diagram illustrating a schematic configuration of an active phased array transmitter having a calibration function.

FIG. 4 is a diagram illustrating a schematic configuration of a general active phased array transmitter having a calibration function.

The general active phased array transmitter includes a TX-PLL synthesizer 11, a modulator 12, a number N (N is an integer of two or greater) of transmitting units, and a number N of transmission antennas 15A to 15N, as described with reference to FIG. 1. The number N of transmitting units include a number N of phase shifters 13A to 13N and a number N of variable gain amplifiers 14A to 14N, respectively. The general active phased array transmitter further includes a reception coupler 16, a BIST-PLL synthesizer 31, a mixer 32, a clock oscillator 33, an A/D converter 34, an FFT processing unit 35, and a calibration controller 36. These units achieve the calibration function.

The reception coupler 16 is arranged near the transmission antennas 15A to 15N. The reception coupler 16 receives radio waves output from the transmission antennas 15A to 15N and generates a received signal. An amplifier for amplifying the received signal or the like may be arranged, but is not illustrated in FIG. 4.

The BIST-PLL synthesizer 31 is a Built-In Self-Test PLL synthesizer and generates a local transmission frequency signal LO having a frequency slightly different from the transmission frequency signal output from the TX-PLL synthesizer 11. For example, the frequency of the transmission frequency signal is 80 GHz, while the frequency of the local transmission frequency signal LO is 80.001 GHz. The difference $\Delta f$ between the frequencies is 1 MHz. The mixer 32 mixes the received signal from the reception coupler 16 with the local transmission frequency signal LO (mixing) and converts the signals to an intermediate frequency signal IF having a low frequency. Since Δf is 1 MHz as described above, the frequency of the intermediate frequency signal IF is 1 MHz.

The clock oscillator 33 outputs a clock CLK having a frequency of, for example, several tens of MHz that is requested to analyze frequency characteristics of the intermediate frequency signal IF having the frequency of 1 MHz. The A/D converter 34 converts the intermediate frequency signal IF to digital data at intervals of the clock CLK. Since the clock CLK has the frequency of several tens of MHz, a general-purpose A/D converter may be used as the A/D converter 34. The FFT processing unit 35 executes a fast Fourier transformation (FFT) process on the digitalized intermediate frequency signal IF by digital processing and detects the amplitude and phase of the intermediate frequency signal IF.

As described above, by executing this process on all the channels, differences between the amplitudes of the signal of the channels (and the amplitude of a signal of a standard channel) and differences between the phases of the signal of the channels (and the phase of the signal of the standard channel) are calculated. The calculated differences between the amplitudes of the signal of the channels and the calculated differences between the phases of the signal of the channels are stored in a lookup table. The calibration controller 36 generates a control signal for controlling the aforementioned series of processes. The amplitude differences stored in the lookup table and the phase differences stored in the lookup table are used for the correction of control values for controlling the phase shifters for the channels and control values for controlling the variable gain amplifiers for the channels when the active phased array transmitter normally operates.

In the configuration provided for the calibration and illustrated in FIG. 4, the high-frequency signals are generated using the two PLL synthesizers in order to generate the intermediate frequency signal IF. Thus, jitter caused by phase noise occurs to the two high-frequency signals (transmission frequency signal and local transmission frequency signal) and are superimposed on the intermediate frequency signal IF. Thus, the jitter superimposed on the intermediate frequency signal IF is large. There is, therefore, a problem that it is difficult to detect the amplitude and phase of the intermediate frequency signal IF with high accuracy due to an effect of the large jitter, and the control values for controlling the phase shifters for the channels and the control values for controlling the variable gain amplifiers for the channels may not be corrected with sufficient accuracy.

This problem occurs when a general active phased array receiver with a calibration function is achieved.

In each of active phased array transmitters described below, an active phased array receiver described below, and an active phased array transceiver described below, a calibration function able to detect the amplitude and phase of a signal of channels with high accuracy is achieved and directional resolution is improved.

Figure 5:
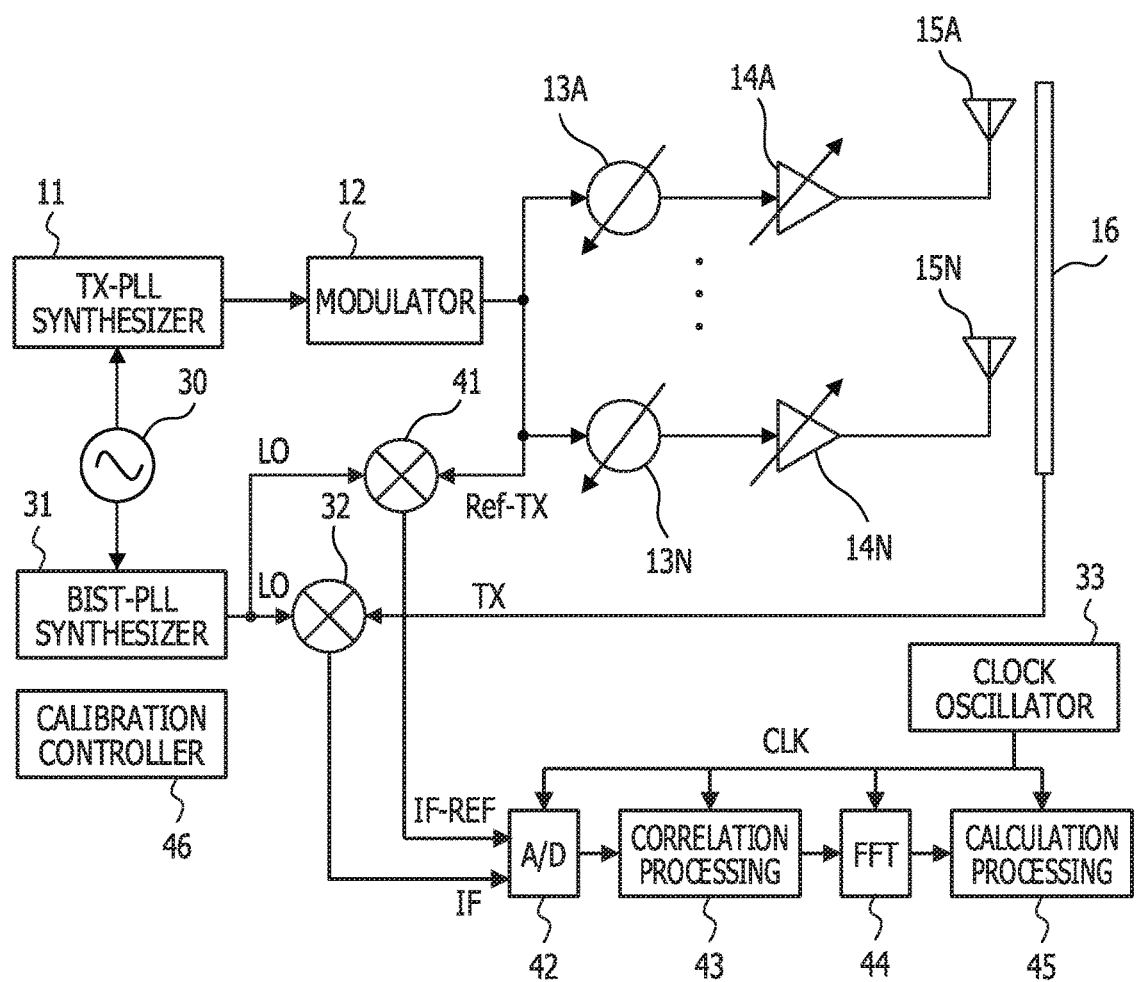
FIG. 5 is a diagram illustrating a schematic configuration of an active phased array transmitter according to a first embodiment.

FIG. 5 is a diagram illustrating a schematic configuration of an active phased array transmitter according to a first embodiment.

The active phased array transmitter according to the first embodiment includes a TX-PLL synthesizer 11, a modulator 12, a number N of transmitting units, and a number N of transmission antennas 15A to 15N. The number N of transmitting units include a number N of phase shifters 13A to 13N and a number N of variable gain amplifiers 14A to 14N, respectively. The active phased array transmitter according to the first embodiment further includes a reception coupler 16, a clock source 30, a BIST-PLL synthesizer 31, a (first) mixer 32, a clock oscillator 33, an A/D converter 42, an FFT processing unit 44, and a calibration controller 46. An amplifier for amplifying a received signal output from the reception coupler 16 is included in the active phased array transmitter in a similar manner to FIG. 4, but is not illustrated in FIG. 5. The aforementioned configuration is the same as or similar to that illustrated in FIG. 4, but processes to be executed by the A/D converter 42, the FFT processing unit 43, and the calibration controller 46 are different from those to be executed in the configuration illustrated in FIG. 4. In addition, the active phased array transmitter according to the first embodiment further includes a (second) mixer 41, a correlation processing unit 43, and a calculation processing unit 45. The clock oscillator 33, the A/D converter 42, the correlation processing unit 43, the FFT processing unit 44, the calculation processing unit 45, and the calibration controller 46 operate in accordance with a clock CLK output from the clock oscillator 33. These units that operate in accordance with the clock CLK, the reception coupler 16, the BIS-PLL synthesizer 31, the mixer 32, and the mixer 41 form a calibration circuit that achieves a calibration function described later.

Return to FIG. 5. Since the configuration illustrated in FIG. 4 is already described, the units related to calibration and added to the configuration according to the first embodiment and the units different from the configuration illustrated in FIG. 4 are described below.

Since a modulated transmission signal output from the modulator 12 is referenced, the modulated transmission signal is referred to as a reference modulated transmission signal Ref-TX. The mixer 41 mixes the reference modulated transmission signal Ref-TX with a local transmission frequency signal LO output from the BIST-PLL synthesizer 31 to generate a second intermediate frequency transmission signal IF-REF. In this example, the frequency of the second intermediate frequency transmission signal IF-REF is 1 MHz. The reference modulated transmission signal Ref-TX is output as radio waves via the transmitting units (phase shifters and variable gain amplifiers) and the transmission antennas and is received by the reception coupler 16. Thus, a received signal TX output from the reception coupler 16 and the reference modulated transmission signal Ref-TX include noise of the TX-PLL synthesizer 11.

The local transmission frequency signal LO includes noise of the BIS-PLL synthesizer 31. Thus, the noise of the TX-PLL synthesizer 11 and the noise of the BIST-PLL synthesizer 31 are superimposed on a first intermediate frequency transmission signal IF generated by the mixer 32 and the second intermediate frequency transmission signal IF-REF generated by the mixer 41. In other words, the noise of the TX-PLL synthesizer 11 and the noise of the BIST-PLL synthesizer 31 may be detected by executing a correlation process on the first intermediate frequency transmission signal IF and the second intermediate frequency transmission signal IF-REF. In the first embodiment, an effect of jitter is offset by the detected noise of the two synthesizers.

In the first embodiment, in order to execute this digital processing, the A/D converter 42 converts the first intermediate frequency transmission signal IF and the second intermediate frequency transmission signal IF-REF to digital data in parallel. The correlation processing unit 43 executes the correlation process by the digital processing. The FFT processing unit 44 executes the FFT process on a correlation relationship obtained by the correlation process, and the calculation processing unit 45 detects transmission relative relationship between the phases and intensities of the signal of the channels from DC components that do not depend on jitter. The FFT processing unit 44 for executing the FFT process and the calculation processing unit 45 for executing a calculation process are collectively referred to as a transmission relative relationship detector.

Figure 6:
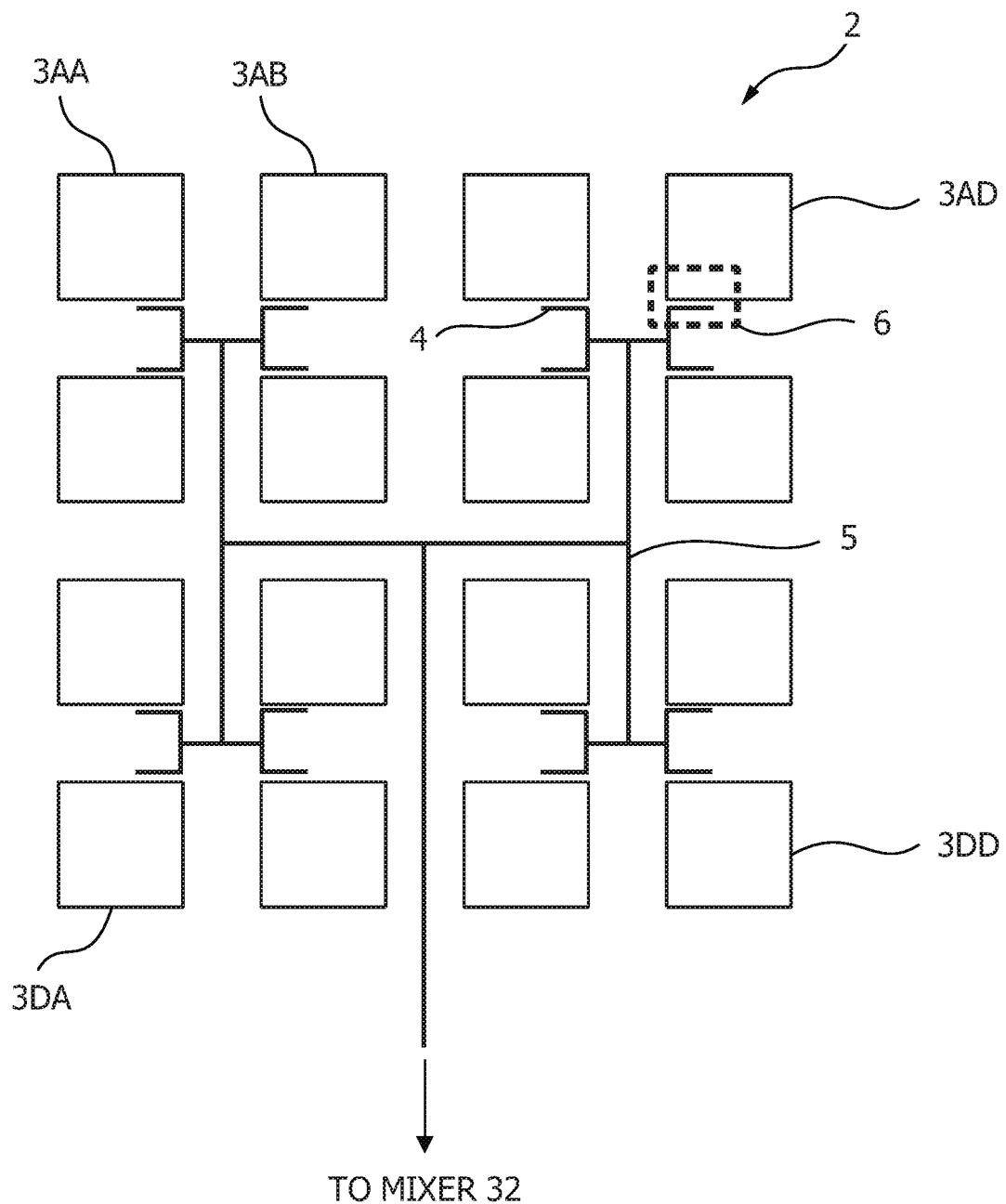
FIG. 6 is a diagram illustrating an example of a plan view of an array antenna having a reception coupler.

FIG. 6 is a diagram illustrating an example of a plan view of an array antenna including the reception coupler.

An array antenna 2 includes 4×4 transmission antennas 3AA to 3DD arranged in a matrix. The transmission antennas has square surfaces, respectively. The transmission antennas are connected to the variable gain amplifiers of the transmitting units via wirings (not illustrated). The array antenna 2 has antenna wires 4 that are located at joint portions as indicated by a dotted line 6 and extend in parallel to sides of the transmission antennas and form the reception coupler. In FIG. 6, the 16 antenna wires 4 are connected to the mixer 32 by a wiring 5. The wiring 5 is arranged so that distances between the antenna wires 4 and the mixer 32 are equal to each other.

The configuration illustrated in FIG. 6 is applicable to a case where the active phased array receiver includes a transmission coupler (described later) and is calibrated.

Figure 7:
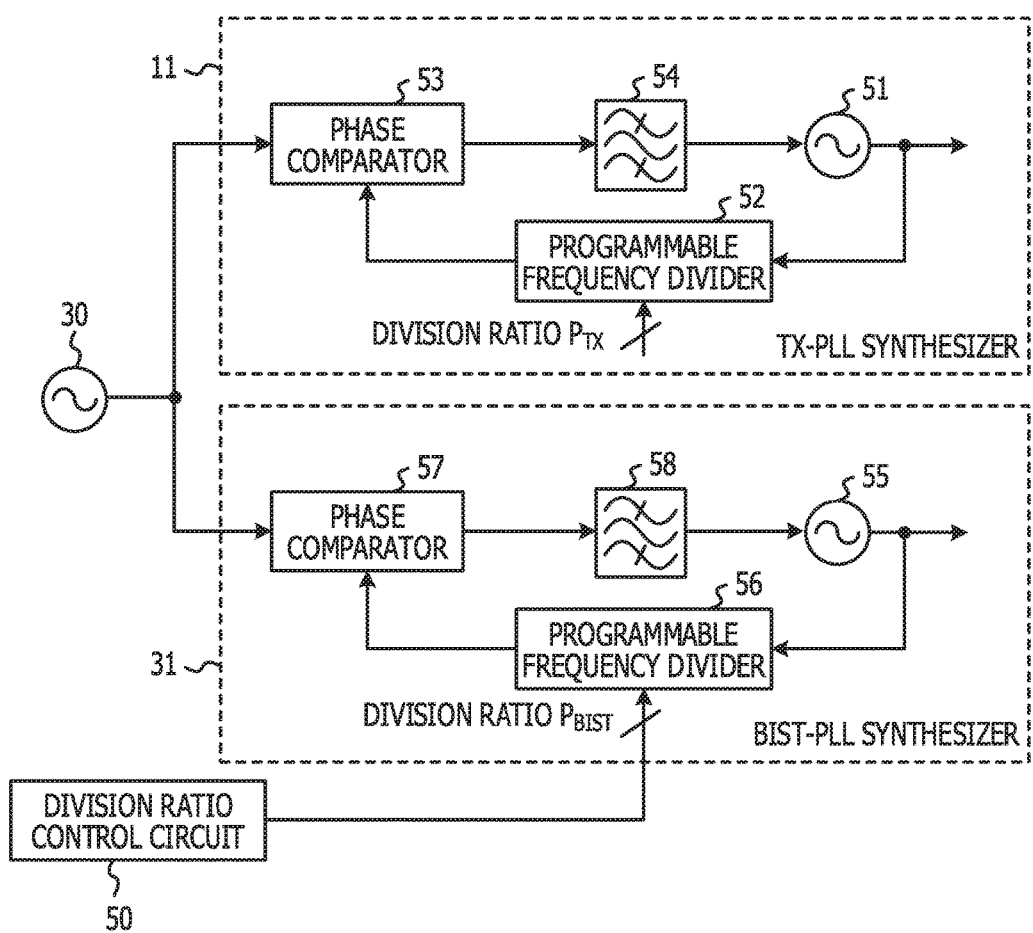
FIG. 7 is a diagram illustrating a detailed configuration of a TX-PLL synthesizer, a clock source, and a BIST-PLL synthesizer.

FIG. 7 is a diagram illustrating a detailed configuration of the TX-PLL synthesizer, the clock source, and the BIST-PLL synthesizer.

The clock source 30 is composed of, for example, a crystal oscillator and generates a reference oscillation signal. The TX-PLL synthesizer 11 includes a voltage-controlled oscillator (VCO) 51, a programmable frequency divider 52, a phase comparator 53, and a loop filter 54. The VCO 51 changes the frequency of the oscillation signal based on a control voltage and outputs the generated oscillation signal as a transmission frequency signal. The programmable frequency divider 52 divides the frequency of the transmission frequency signal in accordance with a division ratio $P_{TX}$ specified by a division ratio control circuit 50 and outputs the frequency-divided signal. The division ratio $P_{TX}$ is set so that the frequency of the frequency-divided signal matches the frequency of the reference oscillation signal. The phase comparator 53 compares the phase of the reference oscillation signal from the clock source 30 with the phase of the frequency-divided signal from the programmable frequency divider 52 and outputs a phase difference signal indicating whether the phase of the frequency-divided signal leads or lags with respect to the phase of the reference oscillation signal. The loop filter 54 removes a high-frequency component of the phase difference signal and generates the control voltage of the VCO 51. The TX-PLL synthesizer 11 has the aforementioned configuration and outputs the transmission frequency signal having the frequency that is $P_{TX}$ times higher than the frequency of the reference oscillation signal. Since such a configuration of a synthesizer circuit is widely known, a detailed description of the TX-PLL synthesizer 11 is omitted.

The BIST-PLL synthesizer 31 has a configuration similar to the TX-PLL synthesizer 11. A division ratio $P_{BIST}$ is different from the division ratio $P_{TX}$. The BIST-PLL synthesizer 31 outputs the local transmission frequency signal LO having a frequency that is $P_{BIST}$ times higher than the frequency of the reference oscillation signal. If $P_{TX}=M$, it is desirable that $P_{BIST}$ be set to M−1 or M+1. The BIST-PLL synthesizer 31 outputs the local transmission frequency signal LO having the frequency slightly different from the frequency of the transmission frequency signal.

Return to FIG. 5. The first embodiment describes a principle of the calculation of the amplitudes and phases of signals of the channels.

It is assumed that the frequency of the transmission frequency signal output from the TX-PLL synthesizer 11 is $f_{TX}$ and that phase noise $\sigma_{TX(t)}$ that affects the transmission frequency signal and serves as jitter is superimposed on the transmission frequency signal. In addition, it is assumed that the frequency of the local transmission frequency signal LO output from the BIST-PLL synthesizer 31 is $f_{LO}$ and that phase noise $\sigma_{LO(t)}$ is superimposed on the local transmission frequency signal LO.

As illustrated in FIG. 5, the modulator 12 modulates the transmission frequency signal and outputs the modulated transmission signal. In the first embodiment, the modulated transmission signal output from the modulator 12 is used as the reference transmission signal Ref-TX. It is assumed that the amplitude and phase of the reference transmission signal Ref-TX are Ar and φr. The reference transmission signal Ref-TX is supplied to the transmitting units (channels), the phase of the reference transmission signal Ref-TX is changed by the phase shifters, and the amplitude of the reference transmission signal Ref-TX is changed by the variable gain amplifiers. After that, the reference transmission signal Ref-TX is output from the transmitting units and received by the reception coupler 16 and become a reception signal TX. Thus, the frequencies of the signals TX and Ref-TX are equal to each other. It is assumed that a reception signal TX from an i-th antenna (channel) has an amplitude Ai and a phase φi.

The mixer 32 mixes the local transmission frequency signal LO with the reception signal TX (mixing) to generate the first intermediate frequency transmission signal IF. The mixer 41 mixes the local transmission frequency signal LO with the reference transmission signal Ref-TX to generate the second intermediate frequency transmission signal IF-REF. The first intermediate frequency transmission signal IF and the second intermediate frequency transmission signal IF-REF are expressed by the following equations. In the equations, a frequency $f_{IF}$ and phase noise $\sigma_{IF(t)}$ are expressed.

The signal IF: $V_{IF(t)} = A_i \cos(2\pi f_{IF} t + \varphi_r + \sigma_{IF(t)})$ The signal IF-REF: $V_{IF\text{-}REF(t)} = A_r \cos(2\pi f_{IF} t + \varphi_r + \sigma_{IF(t)})$ The frequency: $f_{IF} = f_{TX} - f_{LO}$ The phase noise: $\sigma_{IF(t)} = \sqrt{\sigma_{TX(t)}^2 + \sigma_{LO(t)}^2}$  Equations 1

As expressed by the equations described above, the phase noise $\sigma_{TX(t)}$ of the transmission frequency signal and the phase noise $\sigma_{LO(t)}$ of the local transmission frequency signal LO are included in each of the first intermediate frequency transmission signal IF and the second intermediate frequency transmission signal IF-REF. Thus, jitter included in the signal IF and jitter included in the signal IF-REF have a correlation relationship. It is considered that if the correlation relationship is detected, the jitter may be removed by offsetting effects of the jitter.

In the first embodiment, the correlation relationship between the signals IF and IF-REF is detected by digital processing. The signals TX, Ref-TX, and LO have the same frequency as the transmission frequency signal or have frequencies of 80 GHz, for example. The first intermediate frequency transmission signal IF and the second intermediate frequency transmission signal IF-REF have frequencies of 1 MHz, for example. If the first intermediate frequency transmission signal IF and the second intermediate frequency transmission signal IF-REF are converted from analog to digital and have frequencies of several tens of MHz, the profiles of the first and second intermediate frequency transmission signals IF and IF-REF may be sufficiently analyzed. The A/D converter 42 simultaneously samples the signals IF and IF-REF based on the clock output from the clock source 30 and converts the signals IF and IF-REF to digital data. It is assumed that voltage data of the signals IF and IF-REF at each sampling time t is $D_{IF(t)}$ and $D_{IF\text{-}REF(t)}$.

The correlation processing unit 43 executes an integral treatment on $D_{IF(t)}$ and $D_{IF\text{-}REF(t)}$ and calculates an autocorrelation function $R_{IF(t)}$ of $D_{IF(t)}$, an autocorrelation function $R_{IF\text{-}REF(\tau)}$ of $D_{IF\text{-}REF(t)}$, and a cross-correlation function $C_{(t)}$ of $D_{IF(t)}$ and $D_{IF\text{-}REF(t)}$.

$$R_{IF(\tau)} = (1/2T)\int_T [D_{IF(t)} D_{IF(t+\tau)}] dt$$

$$R_{IF\text{-}REF(\tau)} = (1/2T)\int_T [D_{IF\text{-}REF(t)} D_{IF\text{-}REF(t+\tau)}] dt$$

$$C_{(\tau)} = (1/2T)\int_T [D_{IF(t)} D_{IF\text{-}REF(t+\tau)}] dt \qquad \text{Equations 2}$$

The FFT processing unit 44 executes the FFT process on the three correlation functions.

The calculation processing unit 45 calculates, from the results of the FFT process executed on the three correlation functions, three direct current (DC) components $F[R_{IF}](0)$, $F[R_{IF\text{-}REF}](0)$, and $F[C](0)$ that are not affected by jitter and are expressed by the following equations.

$$F[R_{IF}](0) = Ai^2$$

$$F[R_{IF\text{-}REF}](0) = Ar^2$$

$$F[C](0) = Ai \cdot Ar \cos(\phi_i - \phi_r) \qquad \text{Equations 3}$$

The calculation processing unit 45 calculates, from the three DC components, the amplitude $A_i$ of an i-th signal TX and a phase difference $\phi_i - \phi_r$ to be calculated using the signal Ref-TX as a reference. In this manner, the amplitudes and phases of the signal of the channels are calculated while jitter is offset.

Figure 8:
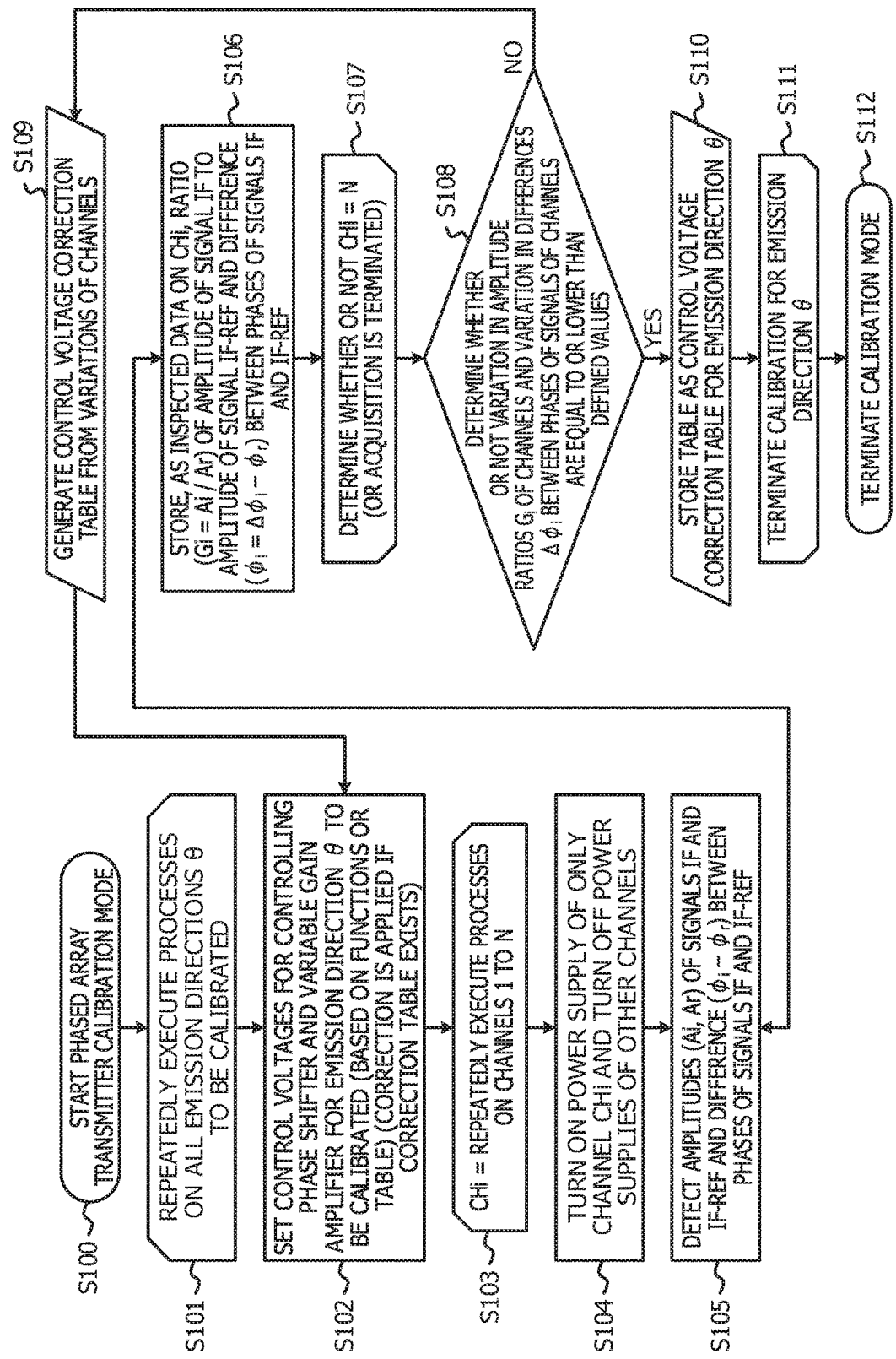
FIG. 8 is a flowchart indicating the flow of a calibration process according to the first embodiment.

FIG. 8 is a flowchart indicating the flow of a calibration process according to the first embodiment. Processes of the calibration process are executed under control by the calibration controller 46.

In step S100, a phased array transmitter calibration mode starts.

Processes of steps S101 to S111 are repeatedly executed at predetermined intervals on all emission directions θ to be calibrated.

In step S102, control voltages for controlling a phase shifter and a variable gain amplifier for an emission direction θ to be calibrated are set based on functions or values stored in the lookup table. In this case, if a correlation table exists, correlation may be executed using the correlation table. It is assumed that the correlation table is used in this case.

The processes of steps S103 to S108 are repeatedly executed on the channels 1 to N (CHi is from 1 to N).

In step S104, a power supply of only a transmitting unit of a channel CHi is turned on (ON) and power supplies of the other transmitting units of the other channels CHi are turned off (OFF). Thus, a reception signal TX of a radio wave output from a transmission antenna of the channel CHi is generated.

In step S105, the amplitude $A_i$ of the first intermediate frequency transmission signal IF, the amplitude $A_r$ of the second intermediate frequency transmission signal IF-REF, and the difference $\phi_i - \phi_r$ between the phases of the first and second intermediate frequency transmission signals IF and IF-REF are detected by the processes described with reference to the aforementioned equations.

In step S106, the ratio of the amplitude $A_i$ of the signal IF to the amplitude $A_r$ of the signal IF-REF and the difference $\phi_i - \phi_r$ between the phases of the signals IF and IF-REF are stored as inspected data ($G_i = A_i/A_r$, $\Delta\phi_i = \phi_i - \phi_r$) of the channel CHi.

In step S107, it is determined whether CHi=N or inspected data is acquired for all the channels. If the acquisition of the inspected data of all the channels is not terminated in step S107, the process returns to step S103.

In step S108, it is determined whether or not a variation in the ratios $G_i$ of the amplitudes of the signal of the channels and a variation in differences $\Delta\phi_i$ between the phases of the signal of the channels are equal to or lower than defined values in the stored inspected data of all the channels. If at least any of the variations exceeds a corresponding defined value, the process proceeds to step S109. If the variations are equal to or lower than the defined values, the process proceeds to step S110.

In step S109, a control voltage correction table for the phase shifters and the variable gain amplifiers is generated (updated) from the variations indicated in the inspected data of the channels. After that, the process returns to step S102. Then, the processes of steps S102 to S108 are repeatedly executed until the process proceeds to step S110.

In step S110, the control voltage correction table generated for the phase shifters and the variable gain amplifiers in the aforementioned manner is stored as a control voltage correction table for the emission direction θ.

In step S111, the calibration for the emission direction θ is terminated, and the emission direction θ is changed by a predetermined pitch. Then, the process returns to step S101. When the calibration for all the emission directions θ to be calibrated is terminated, the process proceeds to step S112 and the calibration mode is terminated.

A simulation is executed to confirm an effect of the signal processing in the first embodiment. The following case is simulated. That is, two signals having phases different by 120° from each other are generated as the signals IF-REF and IF, changes in the phases of the signals due to jitter are distributed in accordance with Gauss distributions, jitter that causes standard deviations of the phase changes σ to become 28° and 114° is superimposed on the signals IF-REF and IF.

Figure 9A:
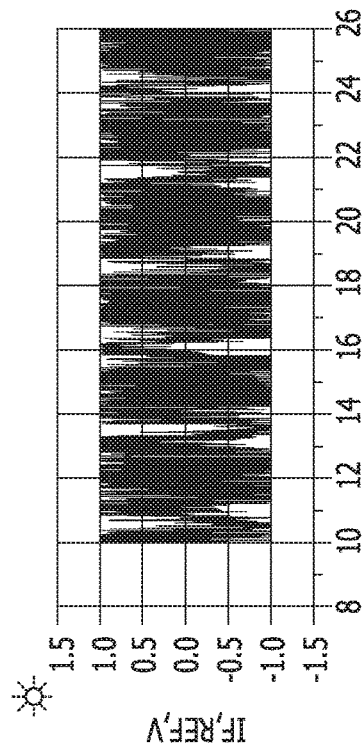
FIGS. 9A to 9D illustrate signal waveforms in a simulation.
Figure 9C:
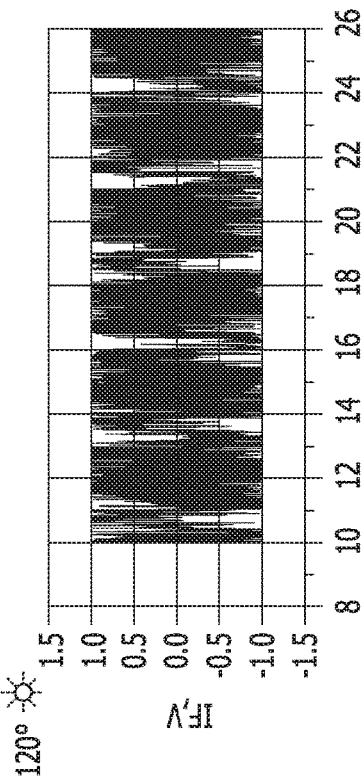
Figure 9B:
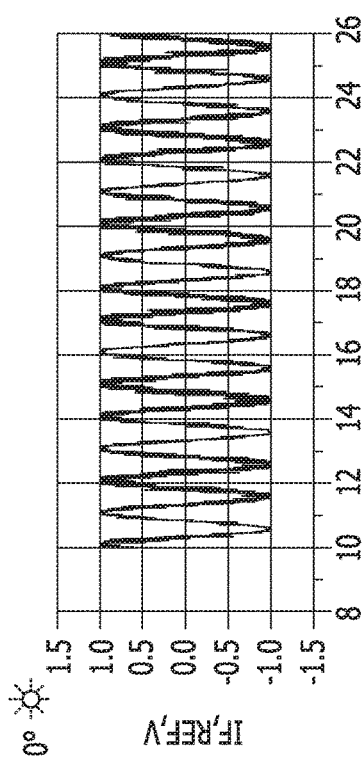
Figure 9D:
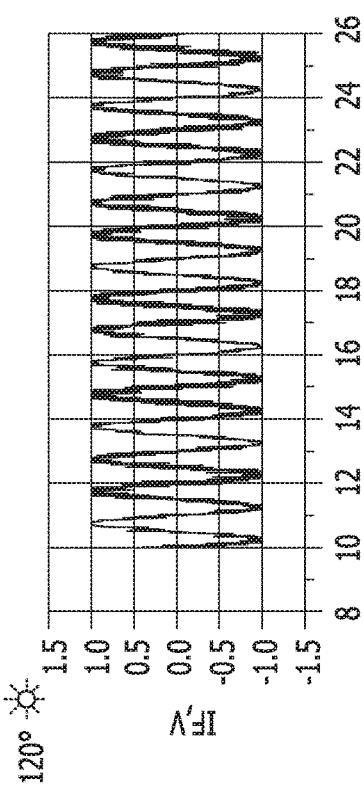

FIGS. 9A to 9D illustrate signal waveforms in the simulation. FIG. 9A illustrates a signal IF-REF(0°) having a phase changed by 28°. FIG. 9B illustrates a signal IF(120°) having a phase changed by 28°. FIG. 9C illustrates a signal IF-REF(0°) having a phase changed by 114°. FIG. 9D illustrates a signal) IF(120°) having a phase changed by 114°. If jitter is large, disturbance in a signal waveform is very large.

Figure 10:
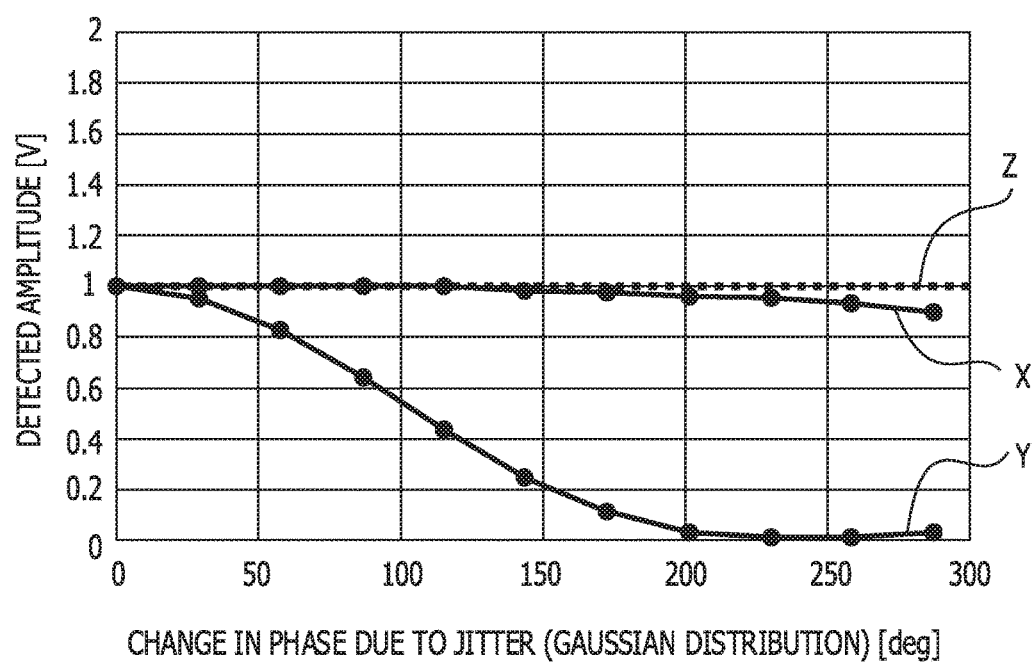
FIG. 10 is a diagram illustrating changes in detected amplitudes with respect to values by which phases change due to jitter in the first embodiment and in a case where a correlation relationship illustrated in FIG. 4 is not detected.

FIG. 10 is a diagram illustrating changes in detected amplitudes with respect to values by which phases change due to jitter in the first embodiment and changes in detected amplitudes with respect to the values by which the phases change due to the jitter in a case where the correlation relationship illustrated in FIG. 4 is not detected. The values by which the phases change due to the jitter are indicated by the abscissa. As described above, the phase changes caused by the jitter are distributed in accordance with Gaussian distributions and are expressed using standard deviations of the phase changes. In FIG. 10, amplitudes detected in the first embodiment are indicated by a line X; amplitudes detected in the case where the correlation relationship illustrated in FIG. 4 is not detected are indicated by a line Y; and true values are indicated by a line Z. In the configuration in which the correlation relationship illustrated in FIG. 4 is not detected, as a phase change caused by jitter increases, a deviation of a detected amplitude from a true value increases. On the other hand, in the first embodiment, it is apparent that even if a phase change caused by jitter is large, an amplitude that is close to a true value is detected.

Figure 11:
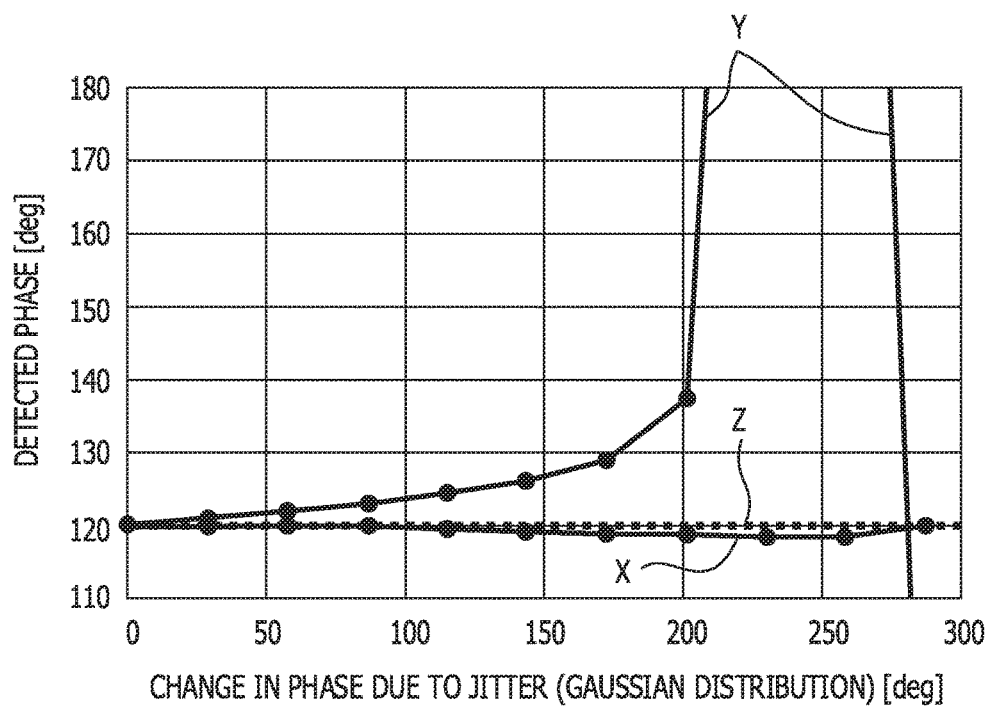
FIG. 11 is a diagram illustrating changes in detected phases with respect to the values by which the phases change due to the jitter in the first embodiment and in the case where the correlation relationship illustrated in FIG. 4 is not detected.

FIG. 11 is a diagram illustrating changes in detected phases with respect to values by which phases change due to jitter in the first embodiment and changes in detected phases with respect to the values by which the phases change due to the jitter in the case where the correlation relationship illustrated in FIG. 4 is not detected. The values by which the phases change due to the jitter are indicated by the abscissa and are the same as those illustrated in FIG. 10. In FIG. 11, amplitudes detected in the first embodiment are indicated by a line X; amplitudes detected in the case where the correlation relationship illustrated in FIG. 4 is not detected are indicated by a line Y; and true values are indicated by a line Z. In the configuration in which the correlation relationship illustrated in FIG. 4 is not detected, as a phase change caused by jitter increases, a deviation of a detected phase from a true value increases. On the other hand, in the first embodiment, it is apparent that even if a change in a phase due to jitter is large, the phase that is close to a true value is detected.

As described above, the active phased array transmitter according to the first embodiment has the calibration function able to detect the amplitude and phase of a signal of multiple transmission channels with high accuracy and may execute the correction with high accuracy and improve directional resolution.

An active phased array transmitter according to a second embodiment that is described below has a configuration similar to that of the active phased array transmitter according to the first embodiment. The active phased array transmitter according to the second embodiment has a configuration different from the configuration including the A/D converter 42, the correlation processing unit 43, and the FFT processing unit 44.

Figure 12:
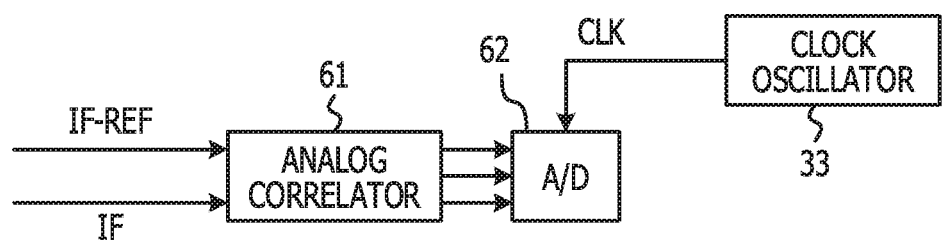
FIG. 12 is a diagram illustrating a configuration including a section for detecting a correlation relationship and a section for converting a detected analog correlation relationship signal to digital data according to a second embodiment.

FIG. 12 is a diagram illustrating a configuration including units for detecting a correlation relationship and converting a detected analog correlation relationship signal to digital data. The FFT processing unit 44 described in the first embodiment may not be arranged in the second embodiment.

In the second embodiment, the autocorrelation functions of the first and second intermediate frequency transmission signals IF and IF-REF and the cross-correlation function are detected by an analog correlator 61.

Figure 13:
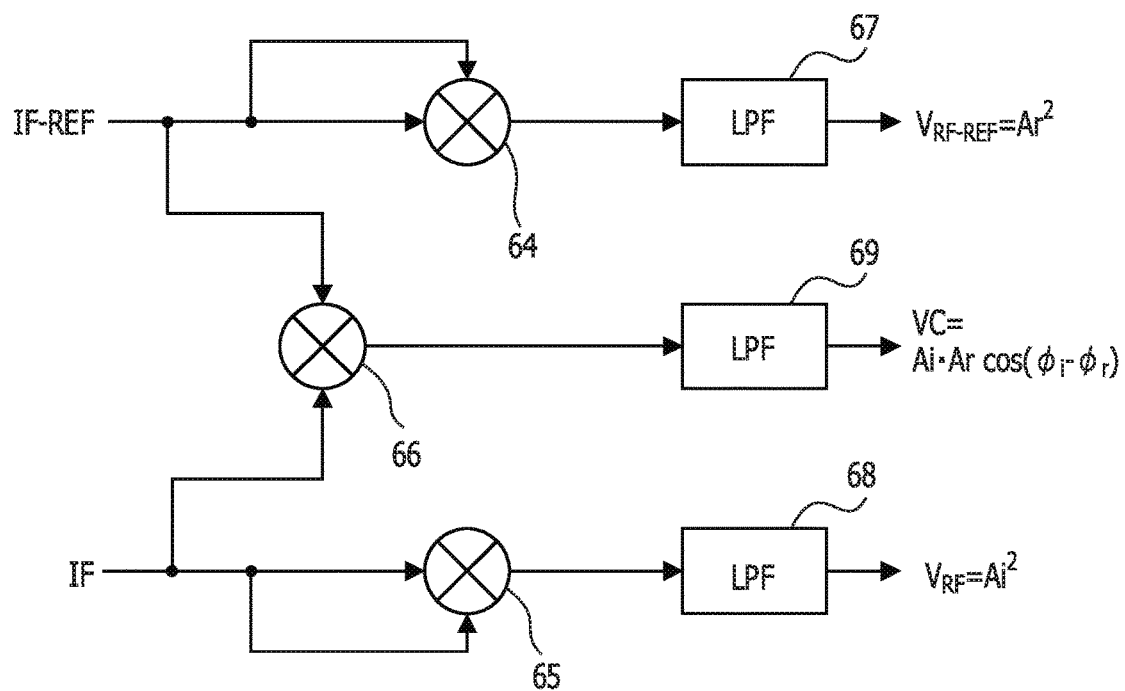
FIG. 13 is a diagram illustrating an example of the configuration of an analog correlator.

FIG. 13 is a diagram illustrating an example of the configuration of the analog correlator.

The analog correlator 61 includes three linear multipliers 64 to 66 and three low path filters (LPFs) 67 to 69. The linear multiplier 64 calculates the square of IF-REF and the LPF 67 extracts a low-frequency component from the output of the linear multiplier 64. The output of the LPF 67 is the amplitude $Ar^2$ of a signal obtained by calculating the square of IF-REF or an autocorrelation function signal of IF-REF. The linear multiplier 65 calculates the square of IF and the LPF 68 extracts a low-frequency component from the output of the linear multiplier 65. The output of the LPF 68 is the amplitude $Ai^2$ of a signal obtained by calculating the square of IF or an autocorrelation function signal of IF. The linear multiplier 66 multiplies IF-REF by IF and the LPF 69 extracts a low-frequency component from the output of the linear multiplier 66. The output of the LPF 69 is a phase difference component $Ai \cdot Ar \cos(\phi_i-\phi_r)$ of a signal obtained by multiplying IF-REF by IF or is a cross-correlation function signal of IF-REF and IF.

The A/D converter 62 converts the two autocorrelation function signals output from the analog correlator 61 and the cross-correlation function signal to digital data. Since the two autocorrelation function signals output from the analog correlator 61 and the cross-correlation function signal are DC signals, a low-speed A/D converter may be used as the A/D converter 62.

The calculation processing unit 45 executes the same process as that described in the first embodiment to detect the amplitudes ($A_i$, $A_r$) of IF and IF-REF and the phase difference ($\phi_i-\phi_r$) from the amplitude $Ar^2$ of IF-REF, the amplitude $Ai^2$ of IF, and the phase difference component $Ai \cdot Ar \cos(\phi_i-\phi_r)$ of IF and IF-REF that have been output from the A/D converter 62.

As described above, the active phased array transmitter according to the second embodiment provides the same effects as that obtained by the transmitter according to the first embodiment and may have a configuration simpler than that described in the first embodiment and may be achieved by low-cost parts.

Figure 14:
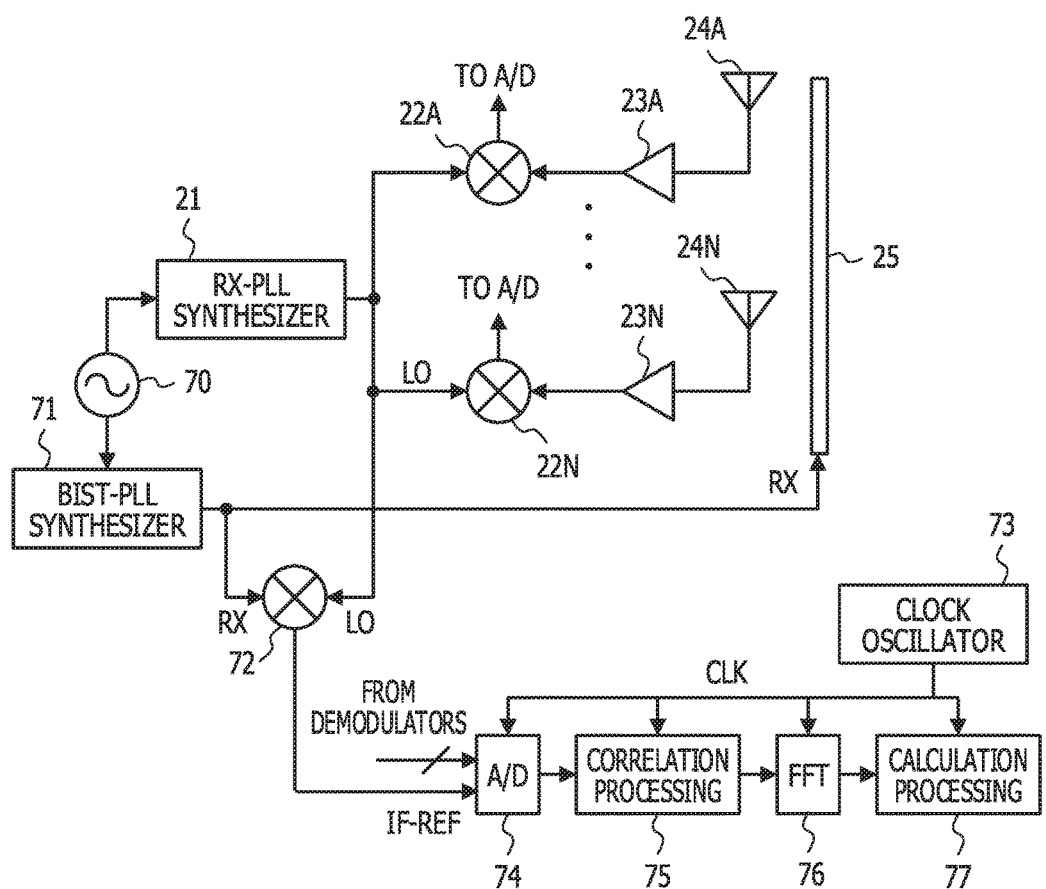
FIG. 14 is a diagram illustrating the configuration of an active phased array receiver according to a third embodiment.

FIG. 14 is a diagram illustrating the configuration of an active phased array receiver according to a third embodiment.

As described with reference to FIG. 3B, the general active phased array receiver calculates correction amounts based on the amplitude difference and phase difference detected from received signals corresponding to radio waves from the transmission coupler 25. In this case, there is a problem that jitter caused by phase noise occurs to a local reception frequency signal generated by the RX-PLL synthesizer 21 and a local reception frequency signal supplied to the transmission coupler 25 and that it is difficult to detect the amplitudes and phases of the signals of the receiving units with high accuracy. The active phased array receiver according to the third embodiment solves this problem, achieves a calibration function able to detect the amplitude and phase of a signal of channels formed by receiving units with high accuracy, and improves directional resolution.

The active phased array receiver according to the third embodiment includes an RX-PLL synthesizer 21, a number N of receiving units, and a number N of reception antennas 24A to 24N. The number N of receiving units include a number N of demodulators 22A to 22N and a number N of low noise amplifier 23A to 23N, respectively. The active phased array receiver according to the third embodiment further includes a transmission coupler 25, a clock source 70, a BIST-PLL synthesizer 71, a mixer 72, a clock oscillator 73, an A/D converter 74, a correlation processing unit 75, an FFT processing unit 76, and a calculation processing unit 77. A calibration controller is included in the active phased array receiver according to the third embodiment, but is not illustrated. The transmission coupler 25, the clock source 70, the BIST-PLL synthesizer 71, the mixer 72, the clock oscillator 73, the A/D converter 74, the correlation processing unit 75, the FFT processing unit 76, the calculation processing unit 77, and the calibration controller form a calibration circuit.

In the third embodiment, the RX-PLL synthesizer 21, the clock source 70, and the BIST-PLL synthesizer 71 are achieved in the same manner as those included in the transmitter illustrated in FIG. 7 and described in the first embodiment. The frequency of a local reception frequency signal LO output from the RX-PLL synthesizer 21 and the frequency of a reception frequency signal RX output from the BIST-PLL synthesizer 71 are close to each other (and are 80 GHz, for example), but different (by 1 MHz, for example) from each other.

The number N of reception antennas 24A to 24N and the transmission coupler 25 are achieved by replacing the transmission antennas with the reception antennas and replacing the reception coupler with the transmission coupler in FIG. 6.

The reception frequency signal RX output from the BIST-PLL synthesizer 71 is supplied to the transmission coupler 25 and the mixer 72. An amplifier for amplifying the reception frequency signal RX to be supplied to the transmission coupler 25 may be included in the active phased array receiver according to the third embodiment, but is not illustrated. The mixer 72 mixes the local reception frequency signal LO output from the RX-PLL synthesizer 21 with the reception frequency signal RX (mixing) to generate a second intermediate frequency reception signal IF-REF. The frequency of the signal IF-REF is 1 MHz.

The multiple demodulators 22A to 22N use the local reception frequency signal LO to demodulate received signals of radio waves transmitted from the transmission coupler 25 and corresponding to the reception frequency signal RX and thereby generate first intermediate frequency reception signals IF. Thus, the frequencies of the signals IF are 1 MHz. Phase noise of the reception frequency signal and phase noise of the local reception frequency signal LO are included in each of the signals IF and IF-REF, like the signals described in the first embodiment. Thus, it is considered that jitter included in the signals IF and jitter included in the signal IF-REF have correlation relationships and that if the correlation relationships are detected, the jitter may be removed by offsetting effects of the jitter.

The A/D converter 74 simultaneously converts a first intermediate frequency reception signal IF output from one of the demodulators 22A to 22N and the second intermediate frequency reception signal IF-REF to digital data. Then, the correlation processing unit 75, the FFT processing unit 76, and the calculation processing unit 77 execute the same processes as described in the first embodiment and detect the amplitude and phase of the first intermediate frequency signal of one receiving unit for the signal IF-REF. By executing these processes on output of all the demodulators 22A to 22N, correction data ($c_{Gi}$, $c_{\phi i}$) of the multiple receiving units is obtained.

The configuration that includes the analog correlator described in the second embodiment is applicable to the active phased array receiver according to the third embodiment.

Figure 15:
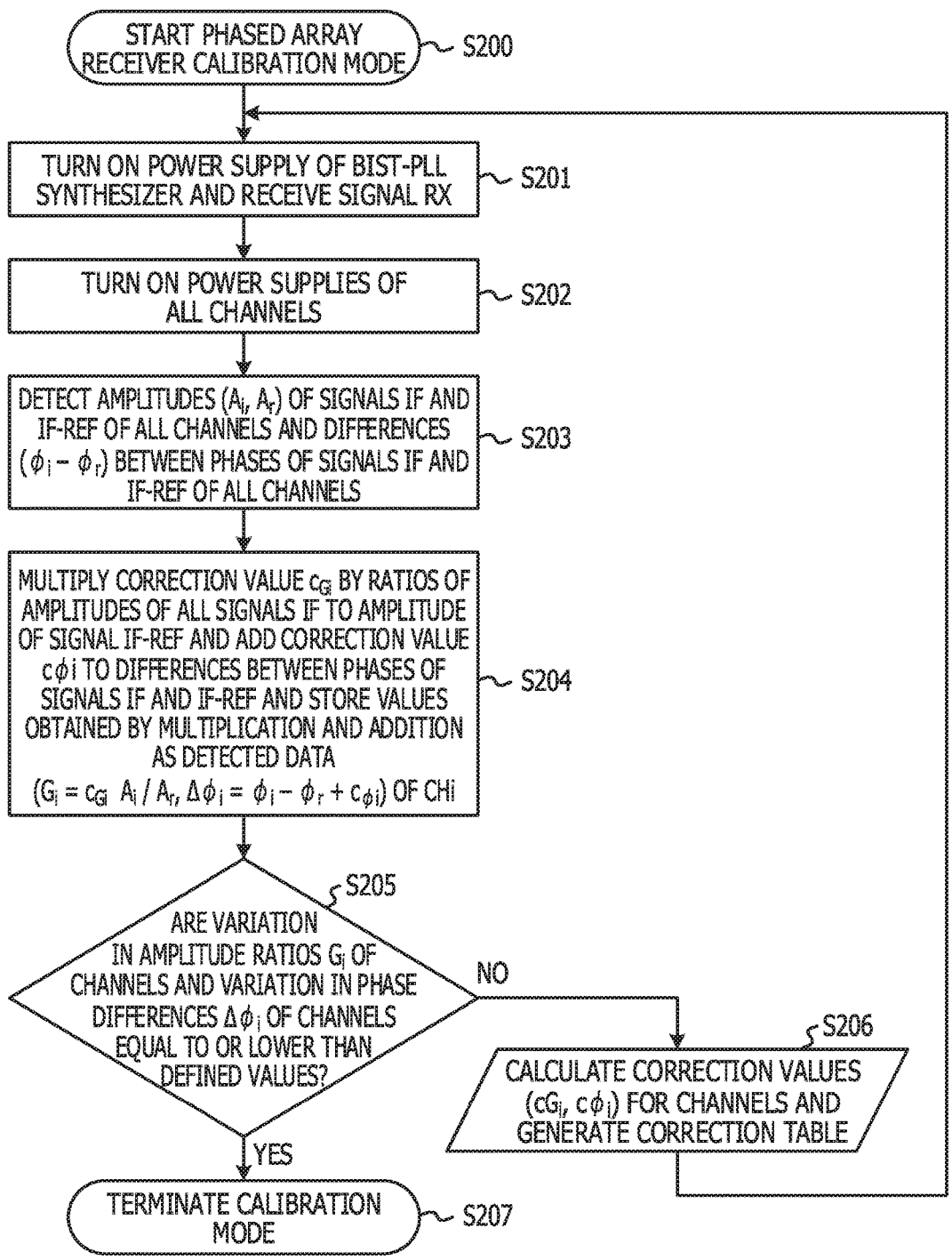
FIG. 15 is a flowchart indicating the flow of a calibration process according to the third embodiment.

FIG. 15 is a flowchart indicating the flow of a calibration process according to the third embodiment. Processes included in the calibration process are executed under control by the calibration controller.

In step S200, a phased array receiver calibration mode starts.

In step S201, a power supply of the BIST-PLL synthesizer 71 is turned on so that the signal RX is able to be received by the receiver via the transmission coupler 25.

In step S202, all the reception channels of the receiver are turned on or all the demodulators 22A to 22N and all the amplifiers 23A to 23N are turned on.

In step S203, while the first intermediate frequency reception signals IF to be input from the demodulators to the A/D converter 74 are sequentially switched, the amplitudes ($A_i$, $A_r$) of the first intermediate frequency reception signals IF of all the reception channels and the signal IF-REF and differences ($\phi_i - \phi_r$) between the phases of the first intermediate frequency reception signals IF of all the reception channels and the phase of the signal IF-REF are detected.

In step S204, the ratios $G_i$ of the amplitudes of the signals IF to the amplitude of the signal IF-REF are multiplied by the correction value $c_{Gi}$; the correction value $c_{\phi i}$ is added to the differences $\Delta\phi_i$ between the phases of the signals IF and the phase of the signal IF-REF; and values obtained by multiplying the ratios $G_i$ by the correction value $c_{Gi}$ and values obtained by adding the correction value $c_{\phi i}$ to the phase differences $\Delta\phi_i$ are stored as detected data ($G_i = c_{Gi} * A_i / A_r$, $\Delta\phi_i = \phi_i - \phi_r + c\phi_i$) of the channels CHi.

In step S205, it is determined whether a variation in the amplitude ratios $G_i$ of the reception channels and a variation in the phase differences $\Delta\phi_i$ of the reception channels are equal to or lower than defined values. If at least any of the variations exceeds a corresponding defined value, the calibration process proceeds to step S206. If the variations are equal to or lower than the defined values, the calibration process proceeds to step S207 and is terminated.

In step S206, the correction values ($c_{Gi}$, $c_{\phi i}$) for the reception channels are calculated and a correlation table is generated. Then, the calibration process returns to step S201. After that, steps S201 to S206 are repeated until the calibration process proceeds to step S207.

As described above, the active phased array receiver according to the third embodiment has the calibration function able to detect the amplitude and phase of a signal of the channels with high accuracy and may execute the correction with high accuracy and improve directional resolution.

Figure 16:
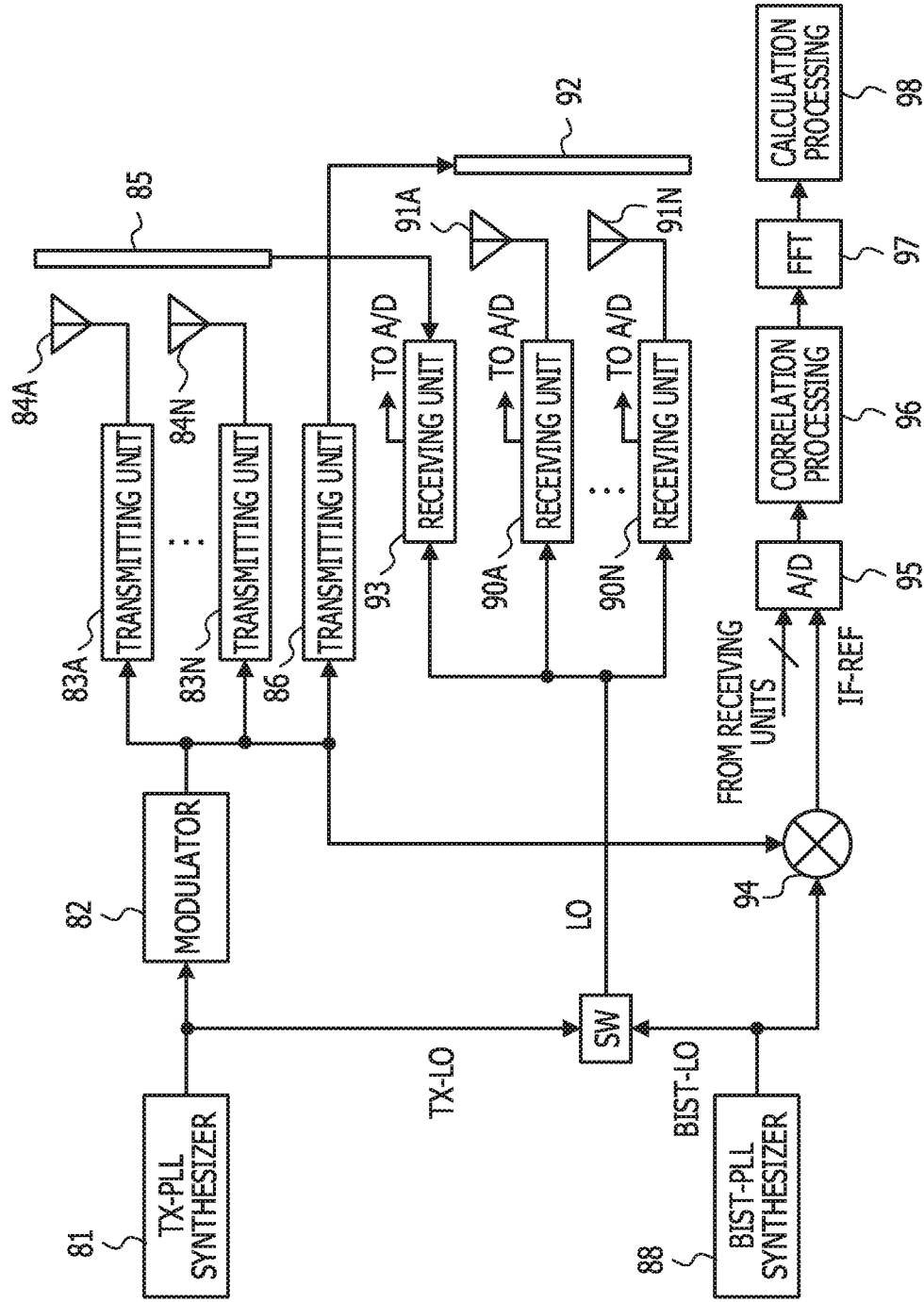
FIG. 16 is a diagram illustrating the configuration of an active phased array transceiver according to a fourth embodiment.

FIG. 16 is a diagram illustrating the configuration of an active phased array transceiver according to a fourth embodiment.

The active phased array transceiver according to the fourth embodiment has the configuration of the transmitter and the configuration of the receiver and has the calibration functions described in the first and third embodiment. The active phased array transceiver according to the fourth embodiment is referred to as a transceiver according to the fourth embodiment.

The transceiver according to the fourth embodiment includes a TX-PLL synthesizer 81, a modulator 82, a number N of transmitting units 83A to 83N, a number N of transmission antennas 84A to 84N, a reception coupler 85, a calibration transmitting unit 86, and a BIST-PLL synthesizer 88. The transceiver according to the fourth embodiment further includes a switch 89, a number N of receiving units 90A to 90N, a number N of reception antennas 91A to 91N, a transmission coupler 92, a calibration receiving unit 93, and a mixer 94. The transceiver according to the fourth embodiment further includes an A/D converter 95, a correlation processing unit 96, an FFT processing unit 97, and a calculation processing unit 98.

The TX-PLL synthesizer 81 and the BIST-PLL synthesizer 88 are achieved together with a clock source (not illustrated) in a similar manner to the synthesizers illustrated in FIG. 7. The BIST-PLL synthesizer 88 generates a local transmission and reception frequency signal BIST-LO that is similar to a high-frequency transmission and reception frequency signal (having a frequency of 80 GHz) generated by the TX-PLL synthesizer 81 (or whose frequency is different by 100 MHz from the frequency of the transmission and reception frequency signal). The modulator 82, the transmission antennas 84A to 84N, and the reception coupler 85 are achieved in the same manner as those included in the transmitter according to the first embodiment. The transmitting units 83A to 83N include a number N of phase shifters 13A to 13N and a number N of variable gain amplifiers 14A to 14N in the same manner as the transmitter according to the first embodiment. The transmission antennas 84A to 84N and the reception coupler 85 are achieved as illustrated in FIG. 6. The calibration transmitting unit 86 supplies a transmission frequency signal to the transmission coupler 92. The calibration transmitting unit 86 may include a variable gain amplifier. The receiving units 90A to 90N include a number N of demodulators 22A to 22N and a number N of low noise amplifiers 23A to 23N in the same manner as the transmitter according to the first embodiment and generate first intermediate frequency reception signals. The reception antennas 91A to 91N and the transmission coupler 92 are achieved in the same manner as the transmitter according to the third embodiment, as illustrated in FIG. 6. The correlation receiving unit 93 includes a demodulator. The correlation receiving unit 93 receives a received signal from the reception coupler 85 and generates a first intermediate frequency transmission signal from the received signal and a reception frequency signal LO. The switch 89 switches the reception frequency signal LO to be supplied to the receiving units 90A to 90N between the transmission and reception frequency signal TX-LO output from the TX-PLL synthesizer 81 and the local transmission and reception frequency signal BIST-LO output from the BIST-PLL synthesizer 88. The mixer 94 mixes a modulated transmission and reception signal output from the modulator 82 with the local transmission and reception frequency signal BIST-LO to generate a second intermediate frequency reception signal IF-REF. The A/D converter 95 selects the first intermediate frequency reception signals from the demodulators of the receiving units 90A to 90N and the first intermediate frequency transmission signal from the demodulator of the calibration receiving unit 93, converts the selected signals to digital data, and converts the signal IF-REF to digital data. The correlation processing unit 96, the FFT processing unit 97, and the calculation processing unit 98 are the same as those described in the first and third embodiments.

When the transceiver according to the fourth embodiment normally operates, the TX-PLL synthesizer 81, the modulator 82, the transmitting units 83A to 83N, and the receiving units 90A to 90N are in ON states, the switch 89 selects the signal TX-LO, and the BIST-PLL synthesizer 88, the calibration transmitting unit 86, the mixer 94, the A/D converter 95, the correlation processing unit 96, the FFT processing unit 97, and the calculation processing unit 98 are in OFF states. The calibration receiving unit 93 may be in an ON state or in an OFF state, but is preferably in the OFF state. Thus, functions of the transmitter and functions of the receiver are achieved.

In a transmitter calibration mode in which the amplitude and phase of the signal output from the multiple transmitting units are detected, the ON states of the TX-PLL synthesizer 81, the modulator 82, and the transmitting units 83A to 83N are maintained. The receiving units 90A to 90N may be in the ON states or in OFF states, but are preferably in the OFF states. The BIST-PLL synthesizer 88, the calibration receiving unit 93, the mixer 94, the A/D converter 95, the correlation processing unit 96, the FFT processing unit 97, and the calculation processing unit 98 are in ON states. The switch 89 selects BIST-LO, and the calibration transmitting unit 86 is in the OFF state. In this case, the calibration receiving unit 93 achieves functions corresponding to the mixer 32 illustrated in FIG. 5. The mixer 94 corresponds to the mixer 41 and the configuration illustrated in FIG. 5 is achieved. Operations are the same as those described in the first embodiment, and a description thereof is omitted.

In a receiver calibration mode in which the amplitude and phase of a signal are detected by the multiple receiving units, the TX-PLL synthesizer 81, the modulator 82, and the receiving units 90A to 90N are in the ON states, and the calibration transmitting unit 86 is in an ON state. The transmitting units 83A to 83N and the calibration receiving unit 93 are in OFF states. The BIST-PLL synthesizer 88, the mixer 94, the A/D converter 95, the correlation processing unit 96, the FFT processing unit 97, and the calculation processing unit 98 are in the ON states. The switch 89 selects BIST-LO. In this case, the calibration transmitting unit 86 corresponds to a signal path extending to the transmission coupler 25 illustrated in FIG. 14, the mixer 94 corresponds to the mixer 72, and the configuration illustrated in FIG. 14 in the third embodiment is achieved. Operations are the same as those described in the third embodiment, and a description thereof is omitted.

Figure 17:
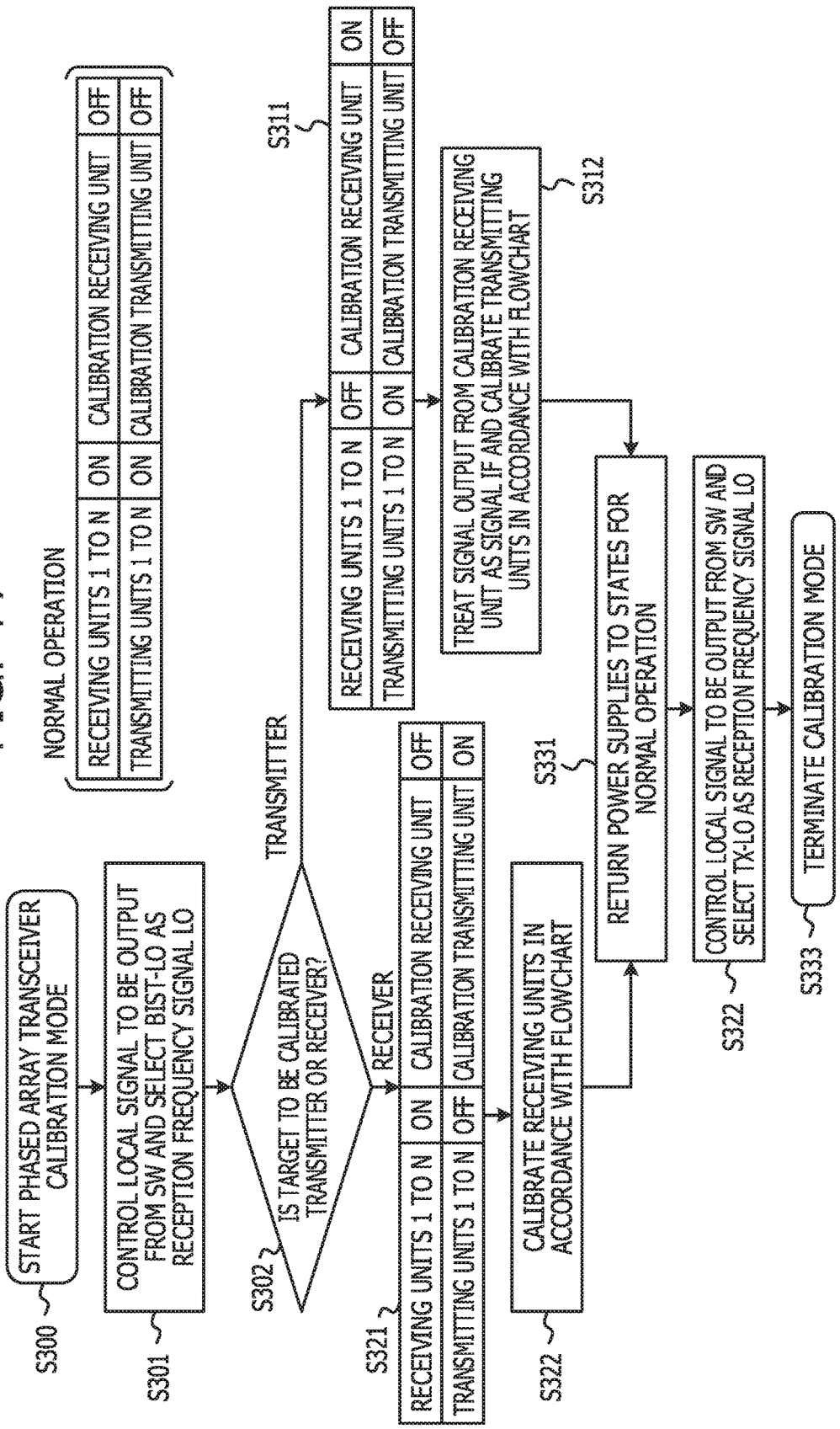
FIG. 17 is a flowchart indicating the flow of a calibration process according to the fourth embodiment.

FIG. 17 is a flowchart indicating the flow of a calibration process according to the fourth embodiment. Processes included in the calibration process are executed under control by a calibration controller that is not illustrated in FIG. 16.

First, when the transceiver according to the fourth embodiment normally operates, the TX-PLL synthesizer 81, the modulator 82, the transmitting units 83A to 83N, and the receiving units 90A to 90N are in the ON states. The calibration transmitting unit 86, the calibration receiving unit 93, the BIST-PLL synthesizer 88, the mixer 94, the A/D converter 95, the correlation processing unit 96, the FFT processing unit 97, and the calculation processing unit 98 are in the OFF states. The switch 89 selects TX-LO.

In step S300, a phased array transceiver calibration mode starts. At the time of the start of the phased array transceiver calibration mode, the BIST-PLL synthesizer 88, the mixer 94, the A/D converter 95, the correlation processing unit 96, the FFT processing unit 97, and the calculation processing unit 98 are set to the ON states.

In step S301, the switch 89 selects the local transmission and reception frequency signal BIST-LO and outputs the local transmission and reception frequency signal BIST-LO as the reception frequency signal LO.

In step S302, it is determined whether a target to be calibrated is the transmitter or the receiver. If the target to be calibrated is the transmitter, the calibration process proceeds to step S311. If the target to be calibrated is the receiver, the calibration process proceeds to step S321.

In step S311, the ON states of the transmitting units 83A to 83N are maintained, the receiving units 90A to 90N are changed from the states upon the normal operation to the OFF states, the OFF state of the calibration transmitting unit 86 is maintained, and the calibration receiving unit 93 is changed from the state upon the normal operation to the ON state.

In step S312, a signal output from the demodulator of the calibration receiving unit 93 is treated as a first intermediate frequency transmission signal IF, and the transmitting units 83A to 83N are calibrated in the same manner as the first embodiment (in accordance with the flowchart illustrated in FIG. 8).

In step S321, the transmitting units 83A to 83N are changed from the states upon the normal operation to the OFF states, the ON states of the receiving units 90A to 90N are maintained, the calibration transmitting unit 86 is changed from the state upon the normal operation to the ON state, and the calibration receiving unit 93 is changed from the state upon the normal operation to the OFF state.

In step S322, signals output from the demodulators of the receiving units 90A to 90N are treated as first intermediate frequency transmission signals IF, and the receiving units 90A to 90N are calibrated in the same manner as the third embodiment (in accordance with the flowchart illustrated in FIG. 15).

As described above, the active phased array transceiver according to the fourth embodiment has the calibration functions able to detect the amplitude and phase of a signal of the transmission channels and the amplitude and phase of a signal of the reception channels with high accuracy and may execute the correction and improve directional resolution.

The configuration that includes the analog correlator described in the second embodiment is applicable to the active phased array transceiver according to the fourth embodiment.

The active phased array transmitters according to the first and second embodiments, the active phased array receiver according to the third embodiment, and the active phased array transceiver according to the fourth embodiment have the calibration circuits and may be calibrated in a field. The active phased array transmitters according to the first and second embodiments, the active phased array receiver according to the third embodiment, and the active phased array transceiver according to the fourth embodiment, however, may be calibrated only in manufacturing processes and use correction data based on the results of the calibration. In such a case, the reception coupler 16 described in the first and second embodiments, the transmission coupler 25 described in the third embodiment, and the reception coupler 85 and the transmission coupler 92 that are described in the fourth embodiment may not be arranged.

Figure 18:
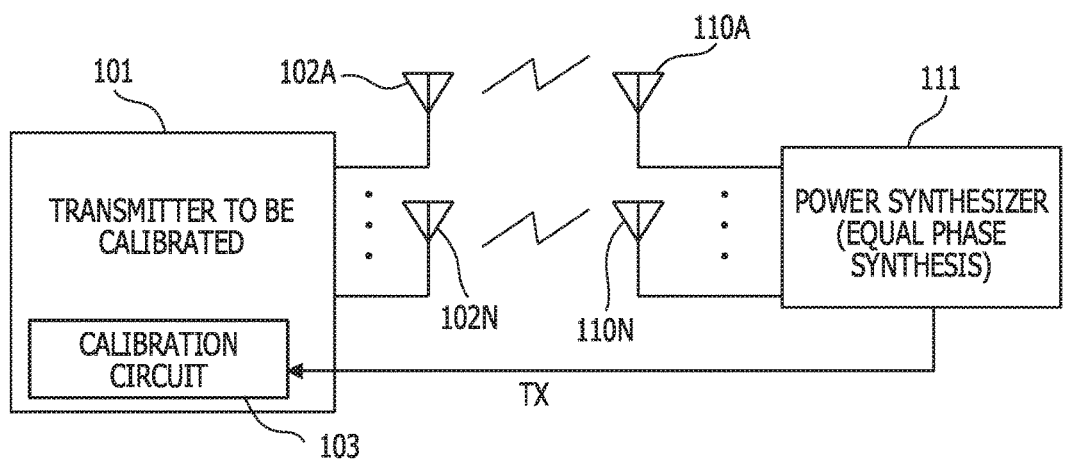
FIG. 18 is a diagram describing a calibration method in a case where the active phased array transmitters according to the first and second embodiments are calibrated in a manufacturing process.

FIG. 18 is a diagram describing a calibration method to be executed in a case where the active phased array transmitters according to the first and second embodiments are calibrated in a manufacturing process.

An active phased array transmitter 101 to be calibrated includes an array antenna composed of multiple transmission antennas 102A to 102N but not includes a reception coupler. In the manufacturing process, a power synthesizer 111 that includes multiple reception antennas 110A to 110N is arranged. The reception antennas 110A to 110N correspond to and extend in parallel to the transmission antennas 102A to 102N. Communication from the transmission antennas 102A to 102N to the reception antennas 110A to 110N may be executed with the same losses at time intervals that are equal to each other. The synthesizer 111 executes equal phase synthesis on signals received from the reception antennas 110A to 11013 to generate a transmission signal TX and transmits the generated transmission signal TX to the calibration circuit 103. In the configuration of the transmitter according to the first embodiment that is illustrated in FIG. 5, the signal is input as a transmission frequency signal TX from the synthesizer 111 to the mixer 32. The calibration method is the same as the calibration method described in the first embodiment or the calibration method described in the second embodiment, and a description thereof is omitted.

Figure 19:
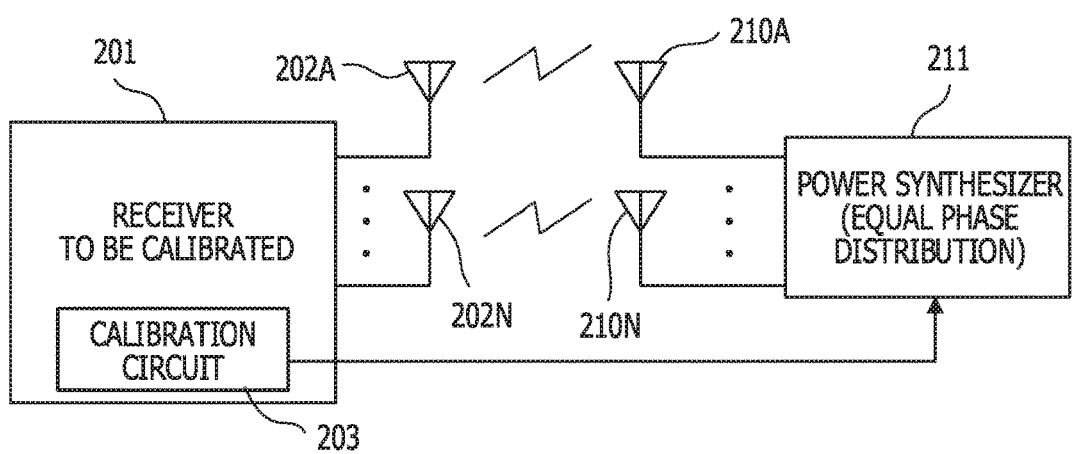
FIG. 19 is a diagram describing a calibration method in a case where the active phased array receiver according to the third embodiment is calibrated in a manufacturing process.

FIG. 19 is a diagram describing a calibration method to be executed in a case where the active phased array receiver according to the third embodiment is calibrated in a manufacturing process.

An active phased array receiver 201 to be calibrated includes multiple reception antennas 202A to 202N but does not include a transmission coupler. In the manufacturing process, a power synthesizer 211 that includes multiple transmission antennas 210A to 210N is arranged. The transmission antennas 210A to 210N correspond to and extend in parallel to the reception antennas 202A to 202N. Communication from the transmission antennas 210A to 210N to the reception antennas 202A to 202N may be executed with the same losses at time intervals that are equal to each other. The synthesizer 211 executes equal phase distribution on the reception frequency signal RX received from the calibration circuit 203 and supplies the signal to the transmission antennas 210A to 210N. In the configuration of the receiver according to the third embodiment that is illustrated in FIG. 14, the reception frequency signal RX from the BIST-PLL synthesizer 71 is transmitted to the power synthesizer 211. The calibration method is the same as that described in the third embodiment, and a description thereof is omitted.

If the active phased array transceiver according to the fourth embodiment is calibrated in a manufacturing process, the power synthesizer 111 illustrated in FIG. 18 and having the multiple reception antennas 110A to 110N and the power synthesizer 211 illustrated in FIG. 19 and having the multiple transmission antennas 210A to 210N are arranged. Since it is sufficient if the calibration of the transmitter and the calibration of the receiver are combined, a description of the combined calibration is omitted.

A method of executing the correlation process on the intermediate frequency signals of the two types, calculating amplitude ratios and phase differences of the channels from the results of the correlation process, and offsetting jitter is applicable to a case where the transmitters, the receiver, and the transceiver that are described in the embodiments do not include a calibration circuit and are calibrated only in the manufacturing processes. A calibration method in this case is described with an example of a method of calibrating an active phased array transmitter.

Figure 20:
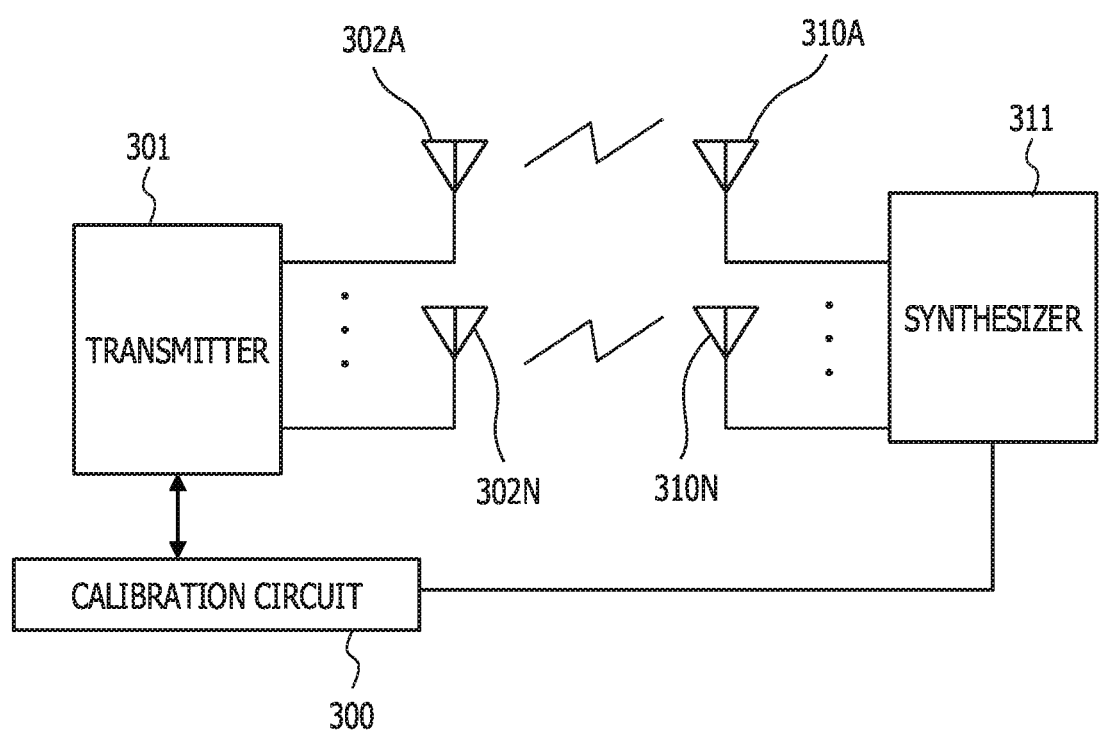
FIG. 20 is a diagram describing a case where an active phased array transmitter that does not include a calibration circuit is calibrated in a manufacturing process.

FIG. 20 is a diagram describing a case where an active phased array transmitter that does not include a calibration circuit is calibrated in a manufacturing process.

An active phased array transmitter 301 includes an array antenna composed of multiple transmission antennas 302A to 302N but does not include a reception coupler. In the manufacturing process, a calibration circuit 300 and a synthesizer 311 having multiple reception antennas 310A to 310N are arranged. The reception antennas 310A to 310N correspond to and extend in parallel to the transmission antennas 302A to 302N. Communication from the transmission antennas 302A to 302N to the reception antennas 310A to 310N is executed with the same losses at time intervals that are equal to each other. The synthesizer 311 executes equal phase synthesis on signals received by the reception antennas 310A to 310N to generate a signal and transmits the generated signal to the calibration circuit 300.

The calibration circuit 300 includes the BIST-PLL synthesizer 31, the mixer 32, the clock oscillator 33, the mixer 41, the A/D converter 42, the correlation processing unit 43, the FFT processing unit 44, the calculation processing unit 45, and the calibration controller 46. The signal output from the synthesizer 311 is input as a transmission frequency signal TX to the mixer 32. A modulated transmission signal output from the active phased array transmitter 301 is input as Ref-TX to the mixer 41. The active phased array transmitter 301 includes the clock source 30. The signal is supplied from the clock source 30 to the BIST-PLL synthesizer 31 of the calibration circuit 300. In this configuration, the calibration method described in the first embodiment or the calibration method described in the second embodiment is executed. A description of the calibration methods is omitted.

The method of offsetting jitter based on the results of the correlation process executed on the intermediate frequency signals of the two types is applicable to the calibration of an active phased array receiver and an active phased array transceiver that do not include a calibration circuit. The active phased array receiver and the active phased array transceiver that do not include a calibration circuit may be calibrated by a calibration method similar to the calibration method described with reference to FIG. 20. A detailed description of the calibration method is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An active phased array transmitter comprising:
a transmission frequency signal source that generates a transmission frequency signal;
a modulator that modulates the transmission frequency signal based on transmission data and outputs the modulated transmission signal;
a plurality of transmitters that change the phase and intensity of the modulated transmission signal;
a transmission phased array antenna including a plurality of transmission antennas that output radio waves corresponding to output of the plurality of transmitters;
a local transmission frequency signal source that generates a local transmission frequency signal having a frequency different by a predetermined frequency from the frequency of the transmission frequency signal;
a first mixer that generates a first intermediate frequency transmission signal from a received signal of the radio waves output from the transmission antennas and the local transmission frequency signal;
a second mixer that generates a second intermediate frequency transmission signal from the modulated transmission signal and the local transmission frequency signal;
a transmission correlation processing circuitry that detects a transmission correlation relationship between the first intermediate frequency transmission signal and the second intermediate frequency transmission signal; and
a transmission relative relationship detector that detects, from the transmission correlation relationship detected by the transmission correlation processing circuitry, transmission relative relationships between the phases and intensities of the radio waves output from the transmission antennas.

2. The active phased array transmitter according to claim 1, further comprising
a reception coupler that commonly receives the radio waves output from the transmission antennas.

3. The active phased array transmitter according to claim 2,
wherein the plurality of transmission antennas is formed in an integrated manner as the transmission phased array antenna; and
wherein the reception coupler is formed together with the transmission phased array antenna.

4. The active phased array transmitter according to claim 1, further comprising
a calibration controller that controls the plurality of transmitters upon the detection of the transmission relative relationships so that one of the transmitters is set to an active state, the other transmitters are set to non-active states, and only the one transmitter outputs a radio wave.

5. The active phased array transmitter according to claim 1,
wherein the transmission correlation processing circuitry detects a transmission autocorrelation of the first intermediate frequency transmission signal, a transmission autocorrelation of the second intermediate frequency transmission signal, and a transmission cross-correlation between the first intermediate frequency transmission signal and the second intermediate frequency transmission signal.

6. The active phased array transmitter according to claim 5,
wherein the transmission correlation processing circuitry includes
a transmission A/D converter that converts the first intermediate frequency transmission signal and the second intermediate frequency transmission signal to digital data, and
a digital transmission correlation processing circuitry that executes digital processing on the first and second intermediate frequency transmission signals converted to the digital data and detects the transmission correlation relationship.

7. The active phased array transmitter according to claim 5,
wherein the transmission correlation processing circuitry includes
an analog transmission correlator that detects the transmission correlation relationship between the first intermediate frequency transmission signal and the second intermediate frequency transmission signal, and
a transmission A/D converter that converts output of the analog transmission correlator to digital data.

8. The active phased array transmitter according to claim 5,
wherein the transmission relative relationship detector includes
a transmission Fourier processing circuitry that executes a Fourier process on the transmission autocorrelation of the first intermediate frequency transmission signal, the transmission autocorrelation of the second intermediate frequency transmission signal, and the transmission cross-correlation between the first intermediate frequency transmission signal and the second intermediate frequency transmission signal, and
a transmission calculation processing circuitry that calculates the transmission relative relationships from a zero-frequency component of the transmission correlation relationship output from the transmission Fourier processing circuitry.

9. A method of calibrating an active phased array transceiver that causes a plurality of transmitters to change the phase and intensity of a transmission signal modulated from a transmission frequency signal based on transmission data and outputs the transmission signal to a transmission phased array antenna including a plurality of transmission antennas, the method comprising:
- generating the transmission frequency signal;
- generating a local transmission frequency signal having a frequency different by a predetermined frequency from the frequency of the transmission frequency signal;
- outputting radio waves corresponding to the modulated transmission signal from the plurality of transmission antennas;
- receiving the radio waves output from the plurality of transmission antennas and generating a reception signal;
- mixing the reception signal with the local transmission frequency signal to generate a first intermediate frequency transmission signal;
- mixing the modulated transmission signal with the local transmission frequency signal to generate a second intermediate frequency transmission signal;
- detecting a transmission correlation relationship between the first intermediate frequency transmission signal and the second intermediate frequency transmission signal; and
- offsetting jitter caused by phase noise of the transmission frequency signal and phase noise of the local transmission frequency signal and detecting, from the detected transmission correlation relationship, transmission relative relationships between the phases and intensities of the radio waves output from the plurality of transmission antennas.

* * * * *